United States Patent
Fujii

(10) Patent No.: US 10,321,323 B2
(45) Date of Patent: Jun. 11, 2019

(54) MOBILE COMMUNICATION SYSTEM AND RADIO RESOURCE CONTROL METHOD

(71) Applicant: SoftBank Corp., Tokyo (JP)

(72) Inventor: Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 35 days.

(21) Appl. No.: 15/522,013

(22) PCT Filed: Nov. 7, 2014

(86) PCT No.: PCT/JP2014/079612
§ 371 (c)(1),
(2) Date: Apr. 26, 2017

(87) PCT Pub. No.: WO2016/072021
PCT Pub. Date: May 12, 2016

(65) Prior Publication Data
US 2017/0318467 A1    Nov. 2, 2017

(51) Int. Cl.
*H04W 4/00*        (2018.01)
*H04W 16/04*       (2009.01)
(Continued)

(52) U.S. Cl.
CPC .......... *H04W 16/04* (2013.01); *H04W 16/32* (2013.01); *H04W 28/16* (2013.01); *H04W 72/0446* (2013.01); *H04W 84/045* (2013.01)

(58) Field of Classification Search
CPC . H04W 16/04; H04W 16/32; H04W 72/0446; H04W 84/045
See application file for complete search history.

(56) References Cited

U.S. PATENT DOCUMENTS

| 5,548,806 A | 8/1996 | Yamaguchi et al. |
| 6,212,389 B1 | 4/2001 | Fapojuwo |

(Continued)

FOREIGN PATENT DOCUMENTS

| JP | 06-224828 A | 8/1994 |
| JP | 6-224828 A | 8/1994 |

(Continued)

OTHER PUBLICATIONS

3GPP, Overview of 3GPP Release 10 V0.2.1, Jun. 2014.

*Primary Examiner* — Minh Trang T Nguyen
(74) *Attorney, Agent, or Firm* — Muirhead and Saturnelli, LLC

(57) ABSTRACT

Mobile communication systems and radio resource control methods are provided, by which interference between two or more base stations can be suppressed and an inter-cell adjusting control of radio resources for each of the two or more base stations can be simplified in a mobile communication system including two or more base stations, at least a part of each cell of the base stations being mutually overlapped. Two or more cell layers are configured by grouping the two or more base station. An inter-cell adjusting control of radio resources (for example, at least one of a synchronization control of time slots and an allocation control of time slots) between the two or more cell layers is performed. An inter-cell adjusting control of radio resources between two or more base stations included in the cell layer (for example, at least one of a synchronization control of time slots and an allocation control of time slots) for each of the cell layers is also performed.

42 Claims, 17 Drawing Sheets

(51) Int. Cl.
  *H04W 16/32*    (2009.01)
  *H04W 28/16*    (2009.01)
  *H04W 72/04*    (2009.01)
  *H04W 84/04*    (2009.01)

(56) References Cited

U.S. PATENT DOCUMENTS

| | | | |
|---|---|---|---|
| 9,014,701 B2* | 4/2015 | Han | H04W 36/32 |
| | | | 455/436 |
| 9,253,731 B2 | 2/2016 | Parkvall et al. | |
| 2014/0342748 A1* | 11/2014 | Zou | H04W 72/0426 |
| | | | 455/452.1 |
| 2018/0006681 A1* | 1/2018 | Bi | H04B 1/7143 |

FOREIGN PATENT DOCUMENTS

| | | |
|---|---|---|
| JP | 11-252636 A | 9/1999 |
| JP | 2001-333458 A | 11/2001 |
| JP | 2008-300989 | 12/2008 |
| JP | 2012-129793 A | 7/2012 |
| KR | 10-2013-0007017 | 1/2013 |

\* cited by examiner

MOBILE COMMUNICATION SYSTEM AND RADIO RESOURCE CONTROL METHOD

TECHNICAL FIELD

The present invention relates to a mobile communication system capable of performing a communication by a mobile station and a radio resource control method of a base station used in the mobile communication system.

BACKGROUND ART

In order to cope with a rapid increase in traffic in a recent mobile communication system, a demand for a small-cell base station (also called such as "micro-cell base station", "pico-cell base station", "femto-cell base station", etc.), which forms a cell (radio communication area) smaller than a conventional macro-cell base station, is increasing. Since a large number of small-cell base stations are widely disposed for coping with an increase in traffic, it is expected that the small-cell base station is disposed in the conventional macro-cell base station and a heterogeneous cellular network (HetNet) of different cell-size mixed type is configured.

As a technique of reducing inter-cell interference between the macro-cell base station and the small-cell base station, an inter-cell interference control technique of controlling and adjusting a radio frame in time domain (in a unit of sub-frame), presupposing that the macro-cell base station and the small-cell base station are mutually synchronized in time, is known (for example, refer to Patent Literature 1 and Non-Patent Literature 1). This inter-cell interference control technique is a technique on the basis of the LTE (Long Term Evolution)—Advanced standards and is also called as "eICIC (enhanced Inter-Cell Interference Coordination)".

CITATION LIST

Patent Literature

Patent Literature 1: Japanese Unexamined Patent Application Publication No. 2012-129793.

Non-Patent Literature

Non-Patent Literature 1: "Overview of 3GPP", Release 10, V0.2.1 (2014-06).

SUMMARY OF INVENTION

Technical Problem

There is a problem that an inter-cell adjusting control performed between the macro-cell base station and the small-cell base station becomes complicated if the foregoing conventional inter-cell interference control technique is applied in the HetNet in which the macro-cell base station and the small-cell base station are disposed mixedly. In particular when the number of small-cell base stations increases, the inter-cell adjusting control is apt to be complicated.

Solution to Problem

A mobile communication system according to one aspect disclosed in the present description, which is a mobile communication system including two or more base stations, at least a part of each cell of the base stations being mutually overlapped, wherein two or more cell layers are configured by grouping the two or more base station, and wherein the mobile communication system comprises two or more intra-cell-layer control section for performing an inter-cell adjusting control of radio resources between two or more base stations included in the cell layer for each of the cell layers and an inter-cell-layer control section for performing an inter-cell adjusting control of radio resources between the two or more cell layers.

In the foregoing mobile communication system, two or more base stations included in the two or more cell layers may be mutually synchronized in time, a same frequency band may be used for radio resources in radio communications between each of the two or more base stations and a mobile station, and the inter-cell adjusting control of radio resources may include at least one of a synchronization control of time slots and an allocation control of time slots in the radio resources.

Furthermore, in the foregoing mobile communication system, the inter-cell-layer control section may transmit time information designating a start timing of time slot of the radio resource for each of the two or more intra-cell-layer control sections, and each of the two or more intra-cell-layer control sections may transmit the time information received from the inter-cell-layer control section, to a base station included in the cell layer corresponding to the intra-cell-layer control section.

Moreover, in the foregoing mobile communication system, the inter-cell-layer control section may transmit identification information designating a time slot to be allocated to the cell layer of the intra-cell-layer control section among two or more time slots forming the radio resource and time information designating a timing to change the allocation of time slot based on the identification information of time slot, to each of the two or more intra-cell-layer control sections, and each of the two or more intra-cell-layer control sections may transmit the identification information of time slot and the time information received from the inter-cell-layer control section, to two or more base stations included in the cell layer corresponding to the intra-cell-layer control section.

Herein, the intra-cell-layer control section may receive information on a traffic amount measured or estimated by the two or more base stations included in the cell layer corresponding to the intra-cell-layer control section from the base station, may determine a traffic amount necessary for the cell layer corresponding to the intra-cell-layer control section based on the information on traffic amount, and may transmit information on the traffic amount necessary for the cell layer to the inter-cell-layer control section, and the inter-cell-layer control section may receive the traffic amount necessary for the cell layer determined by the intra-cell-layer control section, and may determine the number of time-slot allocations and an allocation position of time slot in the radio resource to be allocated to the cell layer, based on the traffic amount necessary for the cell layer, for each of the cell layers.

Further, in the foregoing mobile communication system, each of the two or more intra-cell layer control section may transmit, to each of two or more base stations included in a cell layer corresponding to the intra-cell-layer control section, identification information on time slot allocated to the two or more base stations among two or more time slots allocated to the cell layer.

Herein, the foregoing intra-cell-layer control section may receive, with respect to each of the two or more base stations included in the cell layer corresponding to the intra-celllayer control section, information on interference amount measured or estimated by the base station from the base station, may estimate a traffic amount in the base station based on the information on interference amount, and may determine, with respect to each of the base stations included in the cell layer corresponding to the intra-cell-layer control section, the number of time-slot allocations and an allocation position of time slot in the radio resource to be allocated to the base station so as to maximize or optimize the estimated value of traffic amount in the base station.

Furthermore, in the foregoing mobile communication system, the base stations in the two or more cell layers may be classified and registered so that characteristics including at least of a transmission power and a cell size are different from each other. Moreover, in the foregoing mobile communication system, each of the two or more intra-cell-layer control sections may use an inter-base-station interface via an IP packet network to communicate with a base station included in each of the intra-cell-layer control sections. Further, in the foregoing mobile communication system, the two or more cell layers may include a macro-cell layer formed with two or more macro-cell base stations and a small-cell layer formed with two or more small-cell base station.

Furthermore, a radio resource control method according to another aspect disclosed in the present description, which is a radio resource control method of a base station in a mobile communication system including two or more base stations, at least a part of each cell of the base stations being mutually overlapped, comprises configuring two or more cell layers by grouping the two or more base station, performing an inter-cell adjusting control of radio resources between two or more base stations included in the cell layer for each of the cell layers, and performing an inter-cell adjusting control of radio resource between the two or more cell layers.

Moreover, the foregoing radio resource control method may comprise mutually synchronizing in time between two or more base stations included in the two or more cell layers in which a same frequency band is used for radio resources in radio communications with a mobile station, and the inter-cell adjusting control of radio resource may include at least one of a synchronization control on time slots and an allocation control of time slots in the radio resources.

Further, the foregoing radio resource control method may comprise designating a start timing of time slot of the radio resource for each of the two or more cell layers, and designating a start timing of time slot of the radio resource for a base station included in the two or more cell layers.

Furthermore, the foregoing radio resource control method may comprise designating a time slot to be allocated to the cell layer among two or more time slots forming the radio resource and a timing to change the allocation of time slot, for each of the two or more cell layers, and designating a time slot to be allocated to the cell layer and a timing to change the allocation of time slot, for two or more base stations included in the cell layer, in each of the two or more cell layers.

Herein, the foregoing radio resource control method may comprise measuring or estimating a traffic amount in each of two or more base stations included in the cell layer, with respect to each of the two or more cell layers, determining a traffic amount necessary for each of the two or more cell layers based on a result of the measurement or estimation of traffic amount, and determining the number of time-slot allocations and an allocation position of time slot in the radio resource to be allocated to the cell layer, based on the traffic amount necessary for the cell layer, for each of the two or more cell layers.

Moreover, the foregoing radio resource control method may comprise designating a time slot to be allocated to two or more base stations included in the cell layer among two or more time slots allocated to the cell layer, for the two or more base stations, in each of the two or more cell layers.

Herein, the foregoing radio resource control method may further comprise measuring or estimating interference amount in each of two or more base stations included in the cell layer, with respect to each of the two or more cell layers, estimating a traffic amount in the base station based on a result of the measurement or estimation of interference amount, with respect to each of the two or more base stations, and determining the number of time-slot allocations and an allocation position of time slot in the radio resource to be allocated to the base station so as to maximize or optimize the estimated value of traffic amount in the base station, with respect to each of the two or more base stations.

In the foregoing radio resource control method, the base stations in the two or more cell layers may be classified and registered so that characteristics including at least of a transmission power and a cell size are different from each other. Furtheremore, in the foregoing radio resource control method, an inter-base-station interface via an IP packet network may be used for an inter-cell adjusting control of radio resources between the two or more base stations. Moreover, in the foregoing radio resource control method, the two or more cell layers may include a macro-cell layer formed with two or more macro-cell base stations and a small-cell layer formed with two or more small-cell base station.

According to the mobile communication system and the radio resource control method disclosed in the present description, it is capable of suppressing interference between two or more base stations and simplifying a control of radio resource for each of the two or more base stations, in the mobile communication system including two or more base stations, at least a part of each cell of the base stations being mutually overlapped.

DESCRIPTION OF EMBODIMENTS

Hereinafter, various embodiments of the present invention will be described with reference to the drawings. It is noted that respective figures will only show schematically shape, dimension and positional relationship in a degree such that the present invention can be understood, and therefore, the present invention is not limited only to shape, dimension and positional relationship illustrated in respective figures. Furthermore, numerical values exemplified in the description hereinafter are only preferred examples in the present invention, and therefore, the present invention is not limited to the numerical values exemplified.

Figure 1:
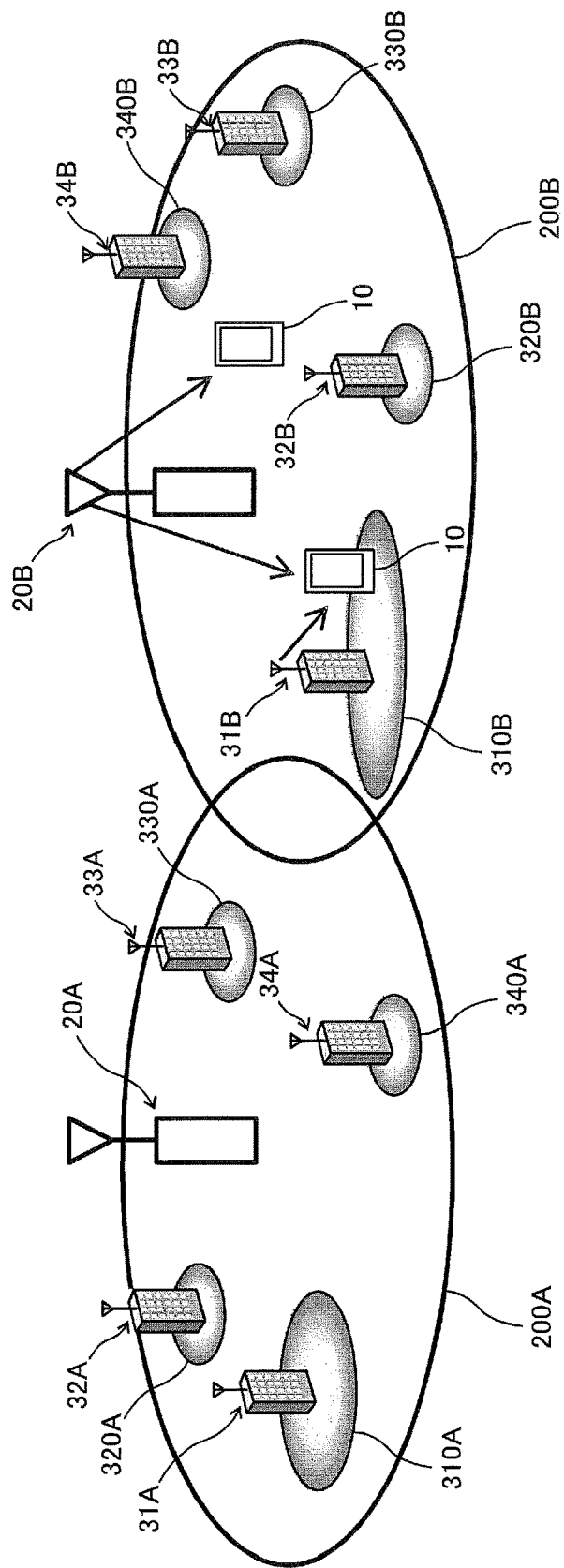
FIG. 1 is an illustration showing one example of an overall configuration of a mobile communication system according to an embodiment of the present invention.

FIG. 1 is an explanatory illustration showing one example of configuration of a Heterogeneous Cellular Network (Het-Net) of different cell-size mixed type in a mobile communication system (portable telephone system) according to an embodiment of the present invention. In FIG. 1, the mobile communication system of this embodiment has macro-cell base stations 20A and 20B and small-cell base stations 31A, 32A, 33A, 34A, 31B, 32B, 33B and 34B, as two or more base stations capable of radio communicating with a mobile station 10. The small-cell base stations 31A, 32A, 33A and 34A are disposed at four positions in a macro cell 200A of one macro-cell base station 20A, respectively, and the small-cell base stations 31B, 32B, 33B and 34B are disposed at four positions in a macro cell 200B of the other macro-cell base station 20B, respectively.

The mobile station 10 is a mobile telephone, a smartphone, a mobile PC having a mobile communication function, or the like, which is also called as user equipment (UE), mobile apparatus, portable communication terminal apparatus. When the mobile station 10 locates in one macro cell 200A, the mobile station 10 communicates with a mobile communication network side via the macro-cell base station 20A corresponding to the macro cell 200A. When the mobile station 10 moves into any one of small cells 31A-34A overlapped in the macro cell 200A, the mobile station 10 communicates with the mobile communication network side via any one of the small-cell base stations 31A-34A. Similarly, when locating in the other macro cell 200B, the mobile station 10 communicates with the mobile communication network side via the macro-cell base station 20B corresponding to the macro cell 200B. When the mobile station 10 moves into any one of small cells 310B-340B overlapped in the macro cell 200B, the mobile station 10 communicates with the mobile communication network side via any one of the small-cell base stations 310B-340B. It is noted that, in FIG. 1, the number of each of the macro-cell base stations and the small-cell base stations can be any number, for example, the macro-cell base station may be disposed at one position, or three or more positions, and the small-cell base station may be disposed at one-three positions, or five or more positions.

Each of the macro-cell base stations 20A and 20B is a base station for wide area which covers a macro cell being as a normal wide area with a radius from about several hundred meters to several kilometers, which may be referred to as "macro-cell base station", "Macro e-Node B", "MeNB", or the like. The macro-cell base stations 20A and 20B are connected to other base stations with for example a wired communication link and can communicate via a predetermined communication interface. The macro-cell base stations 20A and 20B are also connected to a core network of the mobile communication network via a line termination unit and a communication link such as a dedicated link, and can communicate with various nodes such as a server apparatus on the core network via a predetermined communication interface.

Each of the small-cell base stations 31A-34A and 31B-34B is a small-capacity base station which can be disposed indoors such as an ordinary home, shop, office, etc. and a radio communicable distance of the small-cell base station is about several meters to several hundred meters, different from the macro-cell base station for wide area. Since the small-cell base stations 31A-34A and 31B-34B are disposed so as to cover an area smaller than the area covered by the macro-cell base station for wide area in the mobile communication network, the small-cell base station may be referred to as "small-cell base station", "Small e-Node B", "Small eNB", or the like. The small-cell base stations 31A-34A and 31B-34B are also connected to the core network of the mobile communication network via a line termination unit and a communication link such as a public board-band communication including an ADSL (Asymmetric Digital Subscriber Line), an optical line, etc. and can communicate with various nodes such as a server apparatus on the core network via a predetermined communication interface.

In the radio communications between the mobile station 10 and each of the macro-cell base stations 20A and 20B and the small-cell base stations 31A-34A and 31B-34B, a same radio transmission system and a same frequency band are used. As a radio transmission system, for example, a communication system of the third generation (3G) mobile communication system such as WCDMA (registered trademark) (Wideband Code Division Multiple Access), CDMA-2000 or the like, a communication system of the LTE (Long Term Evolution) or LTE-Advanced, a communication system of the forth generation mobile telephone, etc. can be adopted.

The mobile station 10 is configured with, for example, hardware such as a computer apparatus having a CPU, a memory, etc. and radio communication section, and can perform a radio communication with each of the macro-cell base stations 20A and 20B and the small-cell base stations 31A-34A and 31B-34B by executing a predetermined program. Furthermore, each of the macro-cell base stations 20A and 20B and the small-cell base station 31A-34A and 31B-34B is configured with, for example, hardware such as a computer apparatus having a CPU, a memory, etc., a external communication interface section for a core network and a radio communication section, and can perform a radio communication with the mobile station 10 and a communication with the core-network side by executing a predetermined program.

Figure 2:
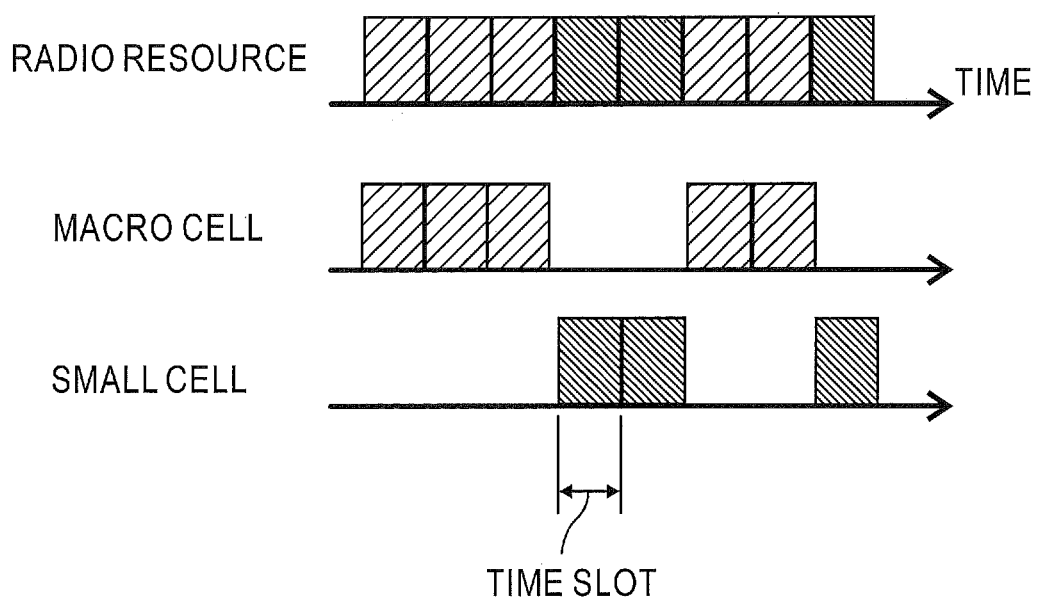
FIG. 2 is an illustration showing an example of arrangement of time slots of radio resource, which are set for each of a macro cell and a small cell in a mobile communication system, according to the present embodiment.

FIG. 2 is an illustration showing an example of arrangement of time slots of radio resource, which are set for each of a macro cell and a small cell in a mobile communication system, according to the present embodiment. In the mobile communication system of the present embodiment, the aforementioned inter-cell interference control technique called as an eICIC is adopted, and time slots different from each other are respectively allocated to the macro cell and the small cell by timely dividing radio resources in a same frequency band. Thereby, it is capable of preventing interference between the macro cell and the small cell in the same frequency band. However, in the conventional inter-cell interference control technique (eICIC), for example, there are problems as shown in the following (1) and (2).

(1) High-accuracy time synchronization control for time slots between the macro-cell base station and the small-cell base station is essential.

(2) Appropriate allocation control for time slots between the macro-cell base station and the small-cell base station is essential.

As a configuration for controlling a base station so as to solve the problems of foregoing (1) and (2), there are a configuration of performing a control by an inter-base-station communication via an optical fiber and a configuration of performing a control by an inter-base-station communication via a inter-base-station interface (for example, an x2 interface in LTE), as shown in the following reference examples.

Figure 3A:
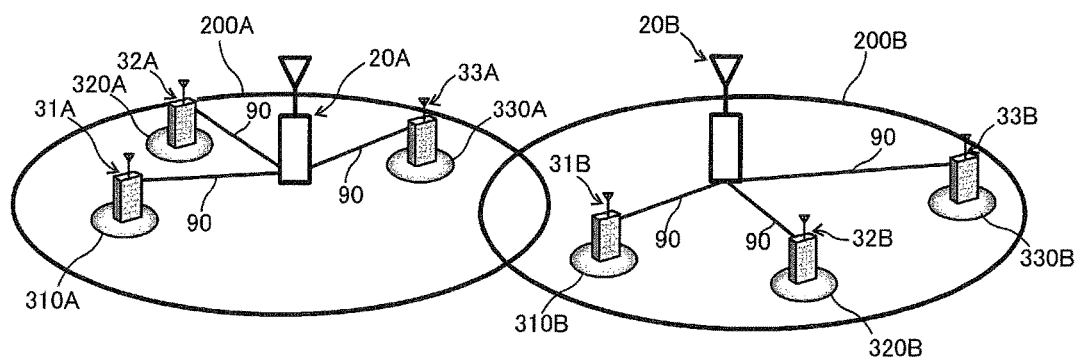
FIG. 3A is an illustration showing a configuration example of a mobile communication system according to a reference example.
Figure 3B:
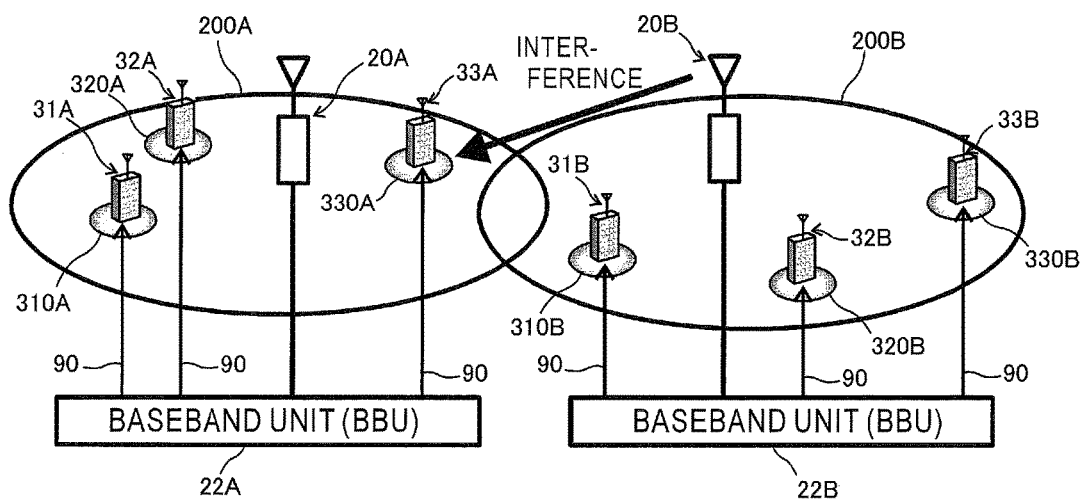
FIG. 3B is an illustration showing an example of control system for an inter-cell adjusting control of radio resources by a baseband unit of a macro-cell base station in the same mobile communication system.

FIG. 3A is an illustration showing a configuration example of a mobile communication system of performing a control by an inter-base-station communication via an optical fiber according to a reference example, and FIG. 3B is an illustration showing an example of control system for an inter-cell adjusting control of radio resources by a baseband unit of a macro-cell base station in the same mobile communication system.

In the present reference example, the BBU (Baseband Unit) 22A of the small-cell base stations 31A, 32A and 33A is disposed in a BBU of the macro-cell base station 20A forming the macro cell 200A in which the small-cell base stations 31A, 32A and 33A are located. Each of the small-cell base stations 31A, 32A and 33A is configured with an RRH (Remote Radio Equipment) provided with an RF section and an amplification apparatus. The macro-cell base station 20A is capable of performing a time synchronization control for time slots and an allocation control for time slots between the macro-cell base station 20A and the small-cell base stations by controlling its own BBU and the BBU 22A of respective small-cell base stations 31A, 32A and 33A. A transmission signal for the macro cell, which is generated by performing the time synchronization control for time slots and the allocation control for time slots like this, is transmitted to the macro cell 200A with a predetermined transmission power by the RF section and amplification section of the macro-cell base station 20A. Furthermore, transmission signals for respective small cells, which are generated by performing the forgoing time synchronization control for time slots and the foregoing allocation control for time slots, are transmitted to the RRH of respective small-cell base stations 31A, 32A and 33A from the BBU 22A in the macro-cell base station 20A via an optical fiber 90 and transmitted to respective small cells 310A, 320A and 330A with a predetermined transmission power by the RRH.

The macro-cell base station 20B and the small-cell base stations 31B, 32B and 33B are similarly configured and a transmission signal, which is generated by performing the foregoing time-slot synchronization control and time-slot allocation control, is transmitted to each of the macro cell 200B and the small cells 310B, 320B and 330B.

In the mobile communication system of the present reference example, the BBUs of the macro cell 200A and the small cells 310A, 320A and 330A are disposed in the BBU of the macro-cell base station 20A, and the BBUs of the macro cell 200B and the small cells 310B, 320B and 330B are disposed in the BBU of the macro-cell base station 20B. Accordingly, it is easy to perform the time-slot synchronization control and the time-slot allocation control between the macro-cell base station 20A and the small-cell base stations 31A, 32A, and 33A and between the macro-cell base station 20B and the small-cell base stations 31B, 32B and 33B, respectively.

However, in the mobile communication system of the present reference example, there is a restriction of the number of base stations that can be disposed in a same BBU. Accordingly, there is a restriction of the number of small-cell base stations that can be controlled by the same BBU of macro-cell base station.

Furtheremore, although it is easy to perform the time-slot synchronization control and the time-slot allocation control between the macro-cell and the small-cell that are corresponding to a same BBU of one macro-cell base station, it is difficult to perform the time-slot synchronization control and the slot allocation control between the macro-cell and the small-cell that are corresponding to the BBU of the other macro-cell base station. Therefore, there is a fear of generating interference, especially in the small cell located at a macro-cell boundary area where the macro cells overlap with each other.

For example, in the reference example shown in FIG. 3A and FIG. 3B, the same BBU (BBU 22A and BBU 22B) is capable of easily performing the time-slot synchronization control and the time-slot allocation control. Accordingly, high-accuracy time synchronization can be performed between the macro cell 200A and the small cells 310A, 320A and 330A that are corresponding to the same BBU 22A and between the macro cell 200B and the small cells 310B, 320B and 330B that are corresponding to the same BBU 22B.

Figure 4:
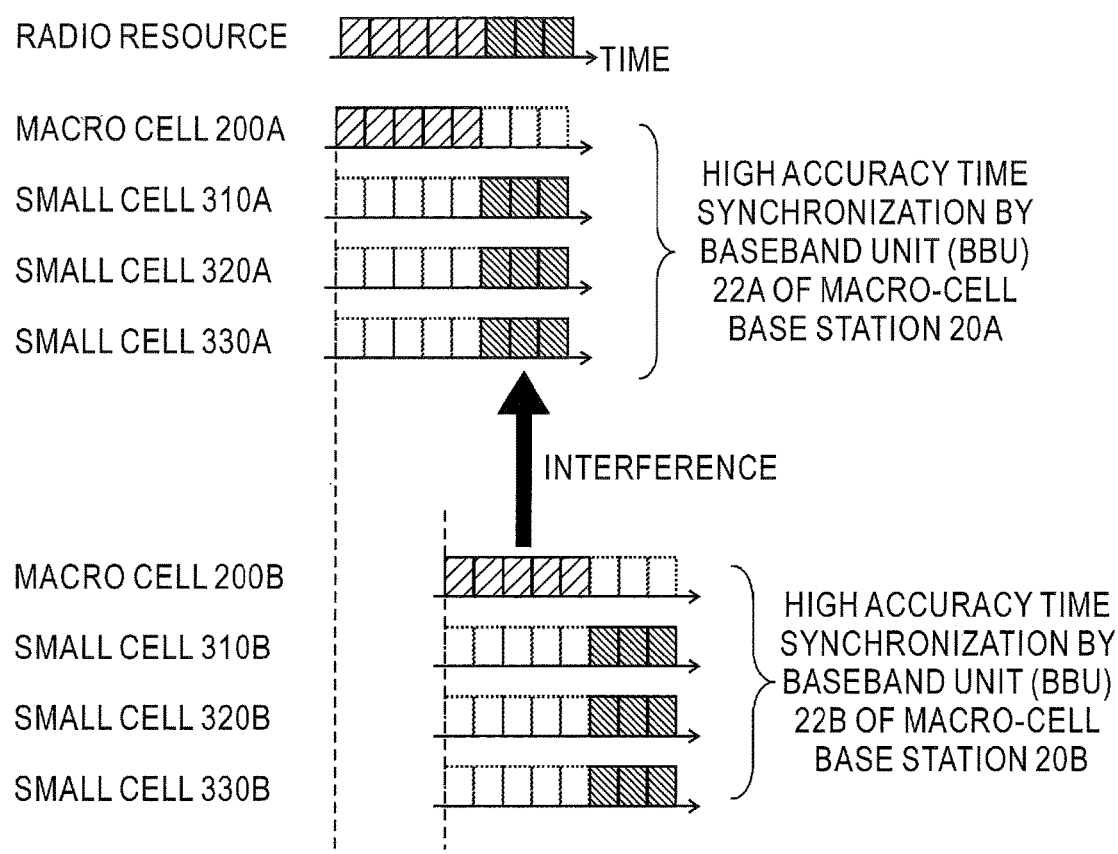
FIG. 4 is an illustration showing an example of radio resources of a macro cell and a small cell when generating inter-cell interference in the mobile communication system according to the reference example shown in FIG. 3A and FIG. 3B.

However, as shown in FIG. 4, since time slots of the two BBU 22A and BBU 22B are not synchronized, there is a fear that the small cells 310A, 320A and 330A receive interference from the macro-cell base station 20B. Similarly, there is a fear that the small cells 310B, 320B and 330B receive interference from the macro-cell base station 20A. Especially, there is a fear that the small cell 330A, which is located near a macro-cell boundary area where end portions of the macro cells 200A and 200B overlap with each other as shown in FIG. 3B, receives a strong interference from the macro-cell base station 20B. Similarly, there is a fear that the small cell 310B located near the macro-cell boundary area receive a strong interference from the macro-cell base station 20A.

Figure 5A:
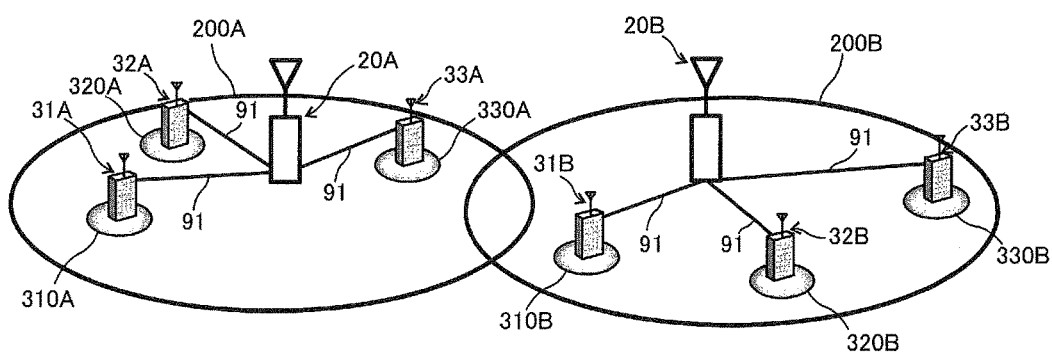
FIG. 5A is an illustration showing a configuration example of a mobile communication system according to another reference example.
Figure 5B:
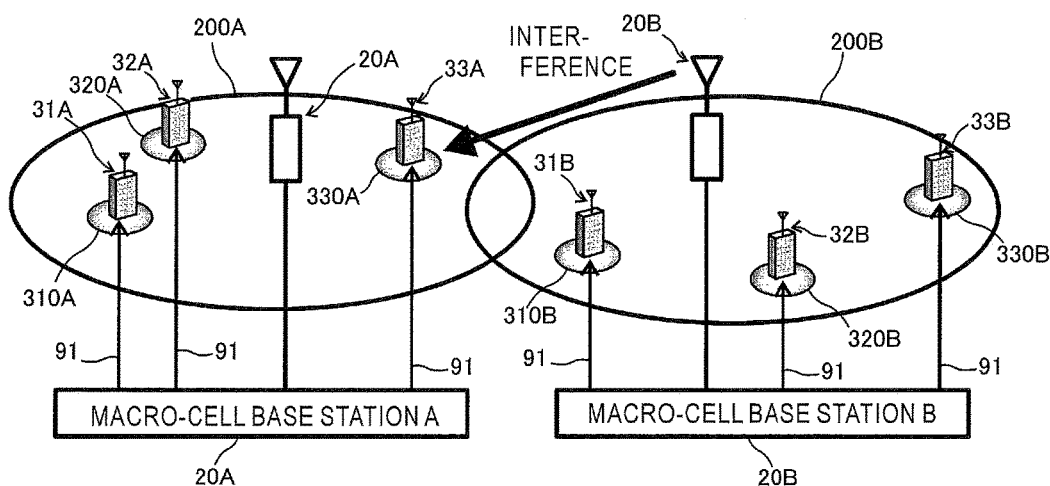
FIG. 5B is an illustration showing an example of control system for an inter-cell adjusting control of radio resources by a macro-cell base station in the same mobile communication system.

FIG. 5A is an illustration showing a configuration example of a mobile communication system according to another reference example, and FIG. 5B is an illustration showing an example of control system for an inter-cell adjusting control of radio resources by a macro-cell base station in the same mobile communication system.

In the present reference example, the macro-cell base station 20A and the small-cell base stations 31A, 32A and 33A are configured so as to be capable of communicating with each other via a general-purpose inter-base-station interface 91 (for example, X2-interface in LTE). The macro-cell base station 20A separately performs a time-slot synchronization control and a time-slot allocation control between itself and each of the small-cell base stations 31A, 32A and 33A via the inter-base-station interface 91. The macro-cell base station 20B and the small-cell base stations 31B, 32B and 33B are similarly configured and the macro-cell base station 20B separately performs a time synchronization control and a time-slot allocation control between itself and each of the small-cell base stations 31B, 32B and 33B via the inter-base-station interface 91.

In the mobile communication system of the reference example, there is no restriction of the number of small-cell base stations controlled by one macro-cell base station. However, it is basic that one macro-cell base station and small-cell base stations located in the macro cell are grouped and controlled as one unit. For example, the macro-cell base station 20A and the small-cell base stations 31A, 32A and 33A located in the macro cell 200A are grouped and controlled as one unit. Therefore, it is difficult that the macro-cell base station 20A performs a time-slot synchronization control and a time-slot allocation control between itself and each of the other macro-cell base station 20B and the small-cell base stations 31B, 32B and 33B located in the macro cell 200B. Accordingly, interference is generated in the small cell at the macro-cell boundary. For example, as shown in FIG. 5B, the small cell 330A located near the macro-cell boundary receives interference from the macro-cell base station 20B or the small cell 310B located near the macro-cell boundary receive interference from the macro-cell base station 20A.

Furthermore, in the mobile communication system of the reference example, when the number of the small-cell base stations increases, it is complicated to perform the time-slot synchronization control and the time-slot allocation control between the macro-cell base station and the small-cell base station.

Therefore, to solve the above-described problem, in the mobile communication system of the present embodiments, an inter-cell adjusting control of radio resource (a time-slot synchronization control and a time-slot allocation control) is performed as described in the following.

Figure 6:
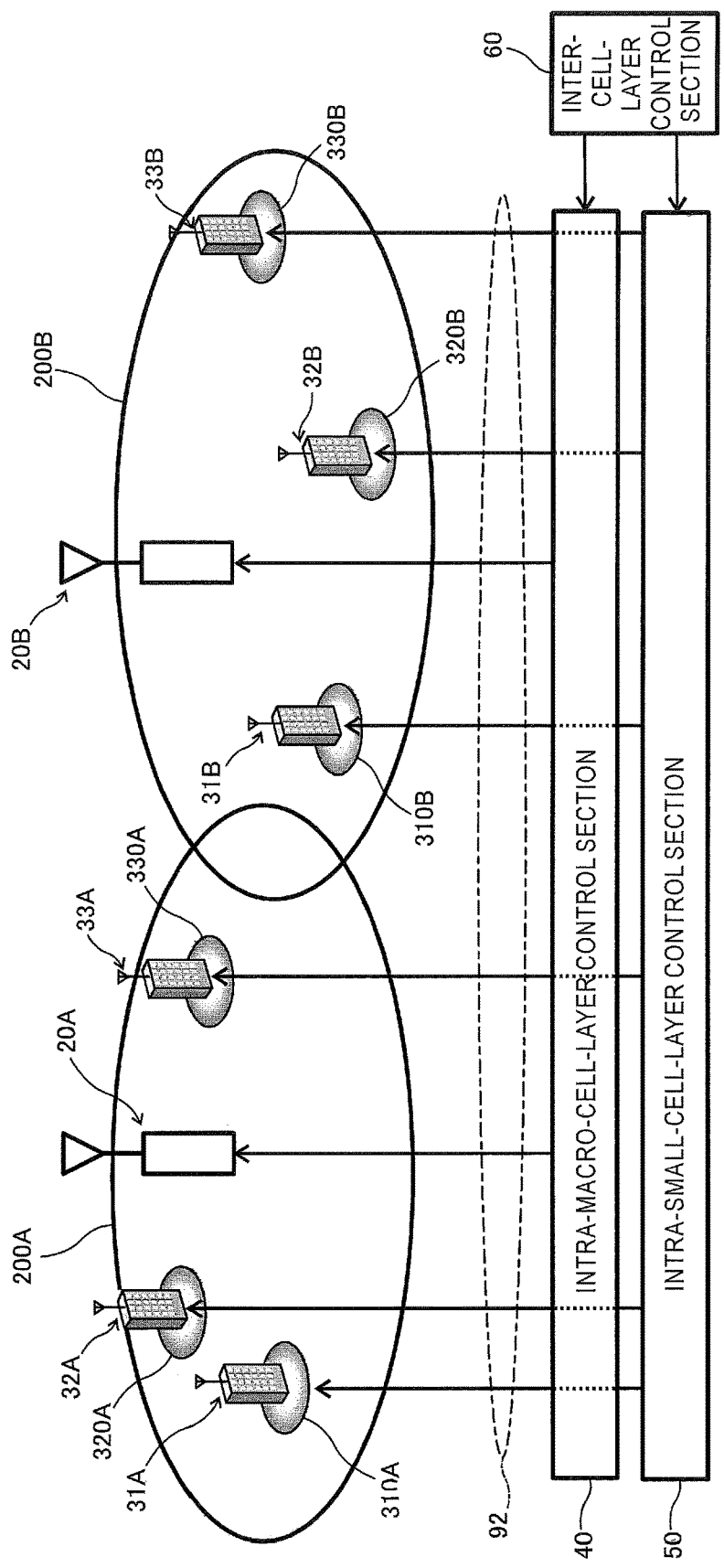
FIG. 6 is an illustration showing an example of control system for an inter-cell adjusting control of radio resources in the mobile communication system according to the present embodiment.

FIG. 6 is an illustration showing an example of control system for an inter-cell adjusting control of radio resources in the mobile communication system according to the present embodiment.

In FIG. 6, two or more cell layers are configured by grouping two or more of macro-cell base stations and small-cell base stations. In the example in FIG. 6, a layer comprising a set of the two or more macro-cell base stations 20A and 20B is assumed to be a macro-cell layer and a layer comprising a set of the two or more small-cell base stations 31A, 32A, 33A, 31B, 32B and 33B is assumed to be a small-cell layer. These plural macro-cell base stations 20A and 20B and small-cell base stations 31A, 32A, 33A, 31B, 32B and 33B included in the two or more cell layers are synchronized in time with each other by, for example, a conventional method using a GPS. Herein, the GPS can be utilized in the outdoor macro cells 200A and 200B, and in the indoor small cells 310A, 320A, 330A, 310B, 320B and 330B where the GPS is not available, a "listening method" that receives a synchronization signal included in a down-link signal from the macro-cell base station 20A and 20B can be used. Thereby, high-accuracy time synchronization at 1 μs (0.000001 sec) level can be performed.

Furtheremore, a same frequency band is used for radio resources in radio communications between the mobile station 10 and each of the two or more of macro-cell base stations 20A and 20B and small-cell base stations 31A, 32A, 33A, 31B, 32B and 33B. Moreover, the small-cell base station 33A among the two or more small-cell base stations in the macro cell 200A is located near the macro-cell boundary.

Further, the mobile communication system of the present embodiment comprises an intra-macro-cell-layer control section 40, an intra-small-cell-layer control section 50 and an inter-cell-layer control section 60, so that an inter-cell adjusting control of radio resources performed between the two or more of macro-cell base stations and small-cell base stations (for example, at least one of a time-slot synchronization control and a time-slot allocation control) is performed by separating a control in a same cell layer and a control between cell layers.

The intra-macro-cell-layer control section 40 performs at least one of a time-slot synchronization control and a time-slot allocation control in radio resources between the two or more macro-cell base stations 20A and 20B included in the macro-cell layer. For this control of the macro-cell base stations by the intra-macro-cell-layer control section 40, a general-purpose inter-base-station interface (for example, an X2 interface in LTE) can be used.

Furtheremore, The intra-small-cell-layer control section 50 performs at least one of a time-slot synchronization control and a time-slot allocation control in radio resources between the two or more small-cell base stations 31A, 32A, 33A, 31B, 32B and 33B included in the small-cell layer. For this control of the small-cell base stations 31A, 32A, 33A, 31B, 32B and 33B by the intra-small-cell-layer control section 50, a general-purpose inter-base-station interface (for example, an X2 interface in LTE) can be also used.

Moreover, the inter-cell-layer control section 60 performs at least one of a time-slot synchronization control and a time-slot allocation control in radio resources between the intra-macro-cell-layer control section 40 and the intra-small-cell-layer control section 50.

The mobile communication system of the present embodiment is layered to the macro-cell layer and the small-cell layer and performs a control for adjusting radio resources (a time-slot synchronization control and a time-slot allocation control) between the base stations by separating the control into the following two controls (i) and (ii):
(i) an intra-cell-layer control in a same cell layer (a control in a macro-cell layer, a control in a small-cell layer); and
(ii) an inter-cell-layer control.

Thereby, the adjusting controls (time-slot synchronization control and time-slot allocation control) of radio resources in a whole of the two or more of macro-cell base stations and small-cell base stations can be simplified.

Further, the mobile communication system of the present embodiment collectively performs the adjusting controls (time-slot synchronization control and time-slot allocation control) of radio resources between the macro-cell layer and the small-cell layer, as an inter-cell-layer control. Adjusting controls (time-slot synchronization control and time-slot allocation control) of radio resources is not performed directly between the macro-cell base station and the small-cell base station.

The intra-macro-cell-layer control section 40, the intra-small-cell-layer control section 50 and the inter-cell-layer control section 60 in the mobile communication system of the present embodiment can be configured, for example, by using a computer apparatus having a CPU, a memory, etc. and an external communication interface section for a core network, and can perform the adjusting controls (time-slot synchronization control and time-slot allocation control) of radio resources by executing a predetermined program. The intra-macro-cell-layer control section 40, the intra-small-cell-layer control section 50 and the inter-cell-layer control section 60 may be configured with mutually separated servers, each of which comprises a computer apparatus, and one of the servers may be configured so as to have functions of any two of intra-macro-cell-layer control section 40, the intra-small-cell-layer control section 50 and the inter-cell-layer control section 60 or to have functions of the three control sections.

Figures 7A, 7B:
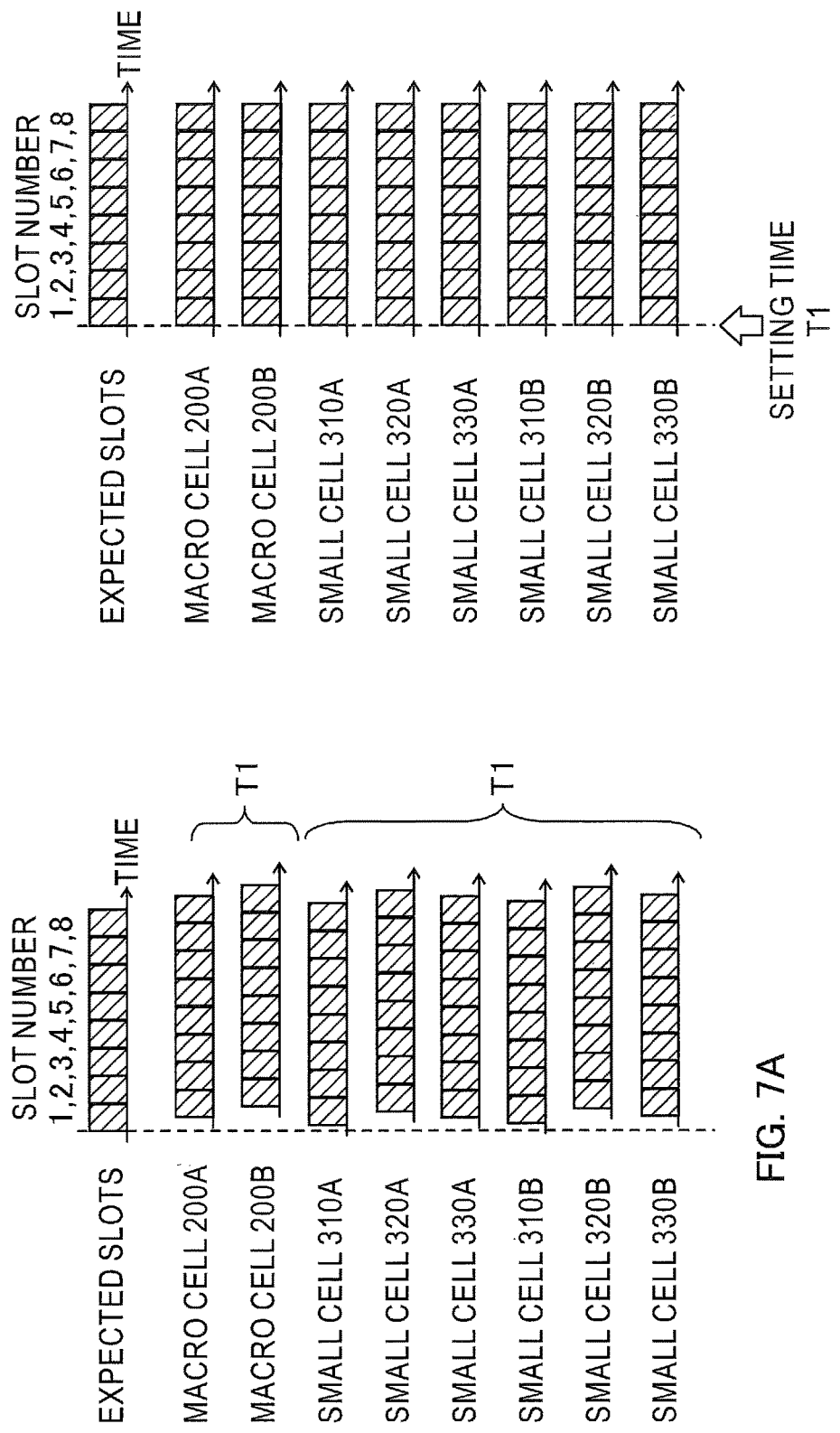
FIG. 7A and FIG. 7B are respectively an illustration showing an example of radio resources of a macro cell and a small cell before and after a time-slot synchronization control in the mobile communication system according to the present embodiment.

FIG. 7A and FIG. 7B are respectively an illustration showing an example of radio resources of a macro cell and a small cell before and after a time-slot synchronization control in the mobile communication system according to the present embodiment.

In a state before performing the time-slot synchronization control as shown in FIG. 7A, time slots are not synchronized in time between the macro cells 200A and 200B and the small cells 310A, 320A, 330A, 310B, 320B and 330B. In this situation, a time-slot synchronization control is performed by the following procedures (S101)-(S103).

(S101) The inter-cell-layer control section 60 designates a timing (absolute time T1) for synchronizing time slots for each of the intra-macro-cell-layer control section 40 and the intra-small-cell-layer control section 50.

(S102) Each of the intra-macro-cell-layer control section 40 and the intra-small-cell-layer control section 50 designates the timing (absolute time T1) for synchronizing time slots for a base station in its own cell layer.

(S103) Each of the base stations that belong to each of the macro-cell layer and the small-cell layer establishes time synchronization of time slots by matching a start of time slot at the foregoing designated absolute time T1.

By performing the time-slot synchronization control by the foregoing procedures (S101)-(S103), as shown in FIG. 7B, it is capable of being a state that time slots are synchronized in time between the macro cells 200A and 200B and the small cells 310A, 320A, 330A, 310B, 320B and 330B.

Figure 8A:
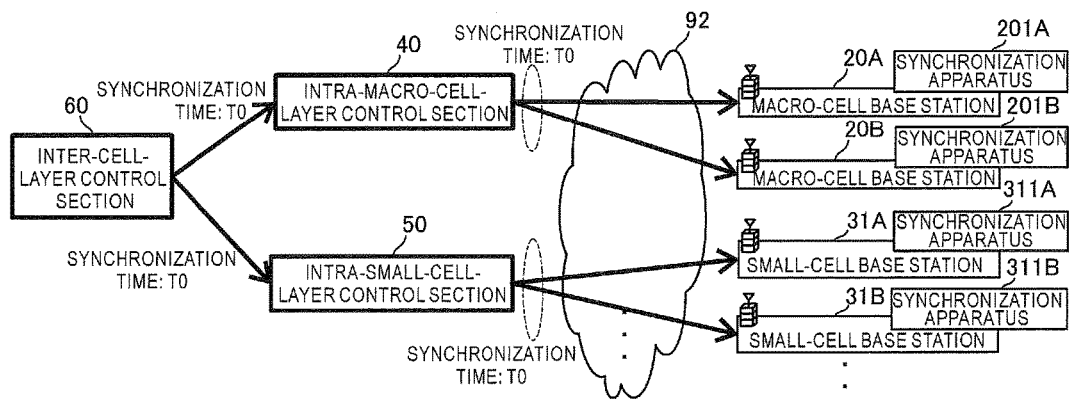
FIG. 8A is an illustration showing a more concrete configuration example of a control system capable of performing a time-slot synchronization control in the mobile communication system according to the present embodiment.
Figure 8B:
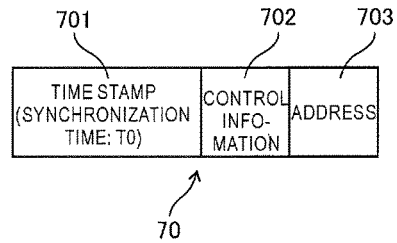
FIG. 8B is an illustration showing a configuration example of a control packet used for the same time-slot synchronization control.
Figure 8C:
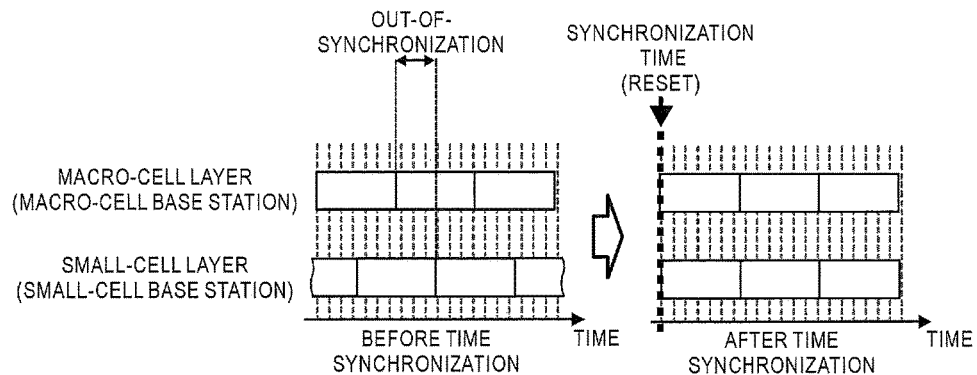
FIG. 8C is an illustration showing a state of changing radio resources before and after the same time-slot synchronization control.

FIG. 8A is an illustration showing a more concrete configuration example of a control system capable of performing a time-slot synchronization control in the mobile communication system according to the present embodiment, FIG. 8B is an illustration showing a configuration example of a control packet used for the same time-slot synchronization control, and FIG. 8C is an illustration showing a state of changing radio resources before and after the same time-slot synchronization control.

In FIG. 8A, the inter-cell-layer control section 60 transmits a control packet 70 including a time stamp that designates a synchronization time (absolute time) T0 for performing a time-slot synchronization control, to each of the intra-macro-cell-layer control section 40 and the intra-small-cell-layer control section 50, at a predetermined timing.

The control packet 70 includes, for example, as shown in FIG. 8B, an inter-cell adjusting control data part 701 in which the foregoing time stamp designating the synchronization time (absolute time) T0 is set, a control information part 702 in which other control information is set, and an address part 703 in which an address of destination of the control packet is set. In the address part 703, for example, an IP address allocated to the intra-macro-cell-layer control section 40 or the intra-small-cell-layer control section 50 is set.

When the intra-macro-cell-layer control section 40 receives a control packet 70 from the inter-cell-layer control section 60, the intra-macro-cell-layer control section 40 transmits the control packet 70 to all of the macro-cell base stations 20A and 20B that belong to the macro-cell layer via a general-purpose inter-base-station interface (for example, an X2 interface in LTE) established in an IP packet network of the mobile communication network, at a predetermined timing after the receiving. In the address part 703 of the control packet 70, for example, an IP address allocated to any one of the macro-cell base stations 20A and 20B, which is the destination of transmission, is set. When each of the macro-cell base stations 20A and 20B receives the control packet 70, a start timing of time slot of the radio resource is controlled so as to match the timing of synchronization time T0 designated with the time stamp of the control packet 70 by synchronization apparatuses 201A and 201B in the base stations.

On the other hand, when the intra-small-cell-layer control section 50 receives a control packet 70 from the inter-cell-layer control section 60, the intra-small-cell-layer control section 50 transmits the control packet 70 to all of the small-cell base stations 31A, 31B, . . . that belong to the small-cell layer via the foregoing general-purpose inter-base-station interface (for example, an X2 interface in LTE), at a predetermined timing after the receiving. In the address part 703 of this control packet 70, for example, an IP address allocated to any one of the small-cell base stations 31A, 31B, . . . which is the destination of transmission, is set. When each of the small-cell base stations 31A, 31B, . . . receives the control packet 70, a start timing of time slot of the radio resource is controlled so as to match to the timing of synchronization time T0 designated with the time stamp of the control packet 70 by synchronization apparatuses 311A, 311B, . . . in the base stations.

It is noted that each of the synchronization apparatuses 201A, 201B, 311A, 311B, . . . in respective base station configured with, for example, the aforementioned computer apparatus having a CPU, a memory, etc. and performs the foregoing control by executing a predetermined program. It is the same in control examples described below.

As shown in FIG. 8C, even in a case that an out-of-synchronism in time slots occurs between the macro-cell layer and the small-cell layer, the time slots can be synchronized between the macro-cell layer and the small-cell layer by performing the foregoing time synchronization control for the time slots at the predetermined timing.

Figure 9:
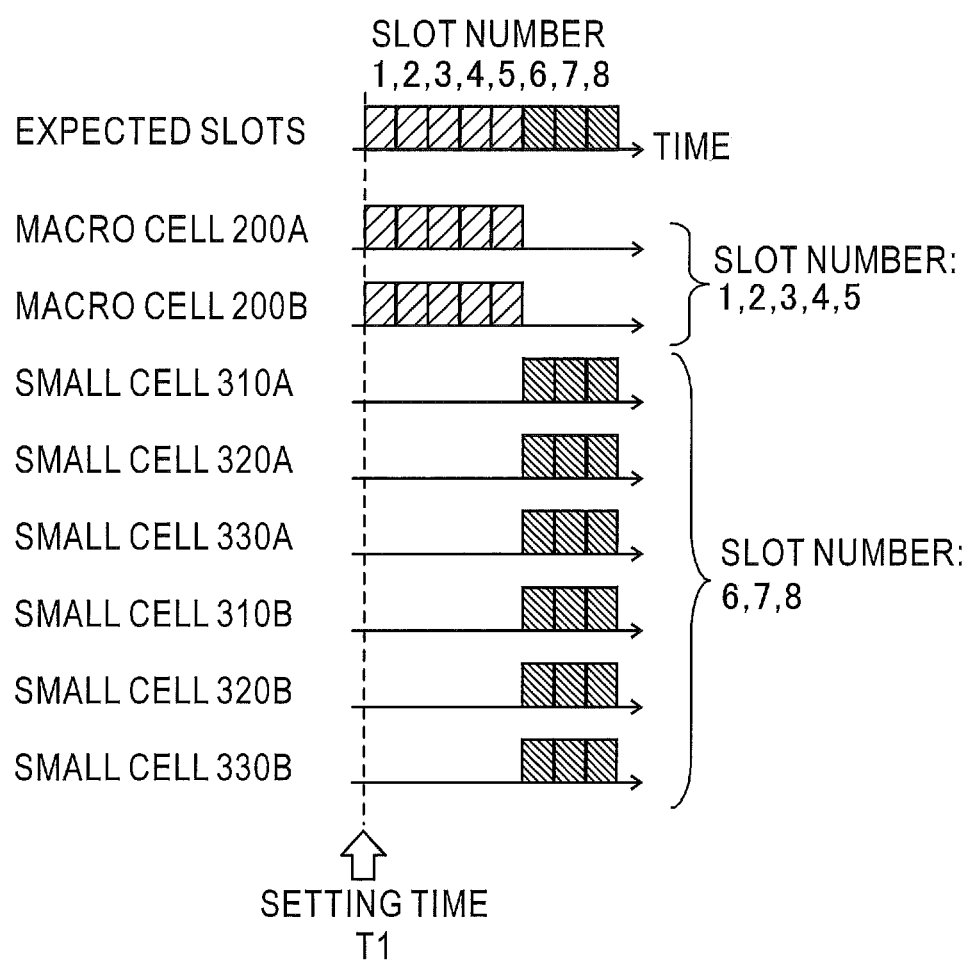
FIG. 9 is an illustration showing an example of radio resources of a macro cell and a small cell after a control of the time-slot allocation control in the mobile communication system according to the present embodiment.

FIG. 9 is an illustration showing radio resources of a macro cell and a small cell after a control of the time-slot allocation control in the mobile communication system of the present embodiment. This time-slot allocation control is performed, assuming that the aforementioned time slots are synchronized between respective base stations, for example, by the procedures (S201)-(S203).

(S201) The inter-cell-layer control section 60 designates allocation numbers (slot numbers) of time slots and a timing (absolute time T1) for setting the allocation numbers for each of the intra-macro-cell-layer control section 40 and the intra-small-cell-layer control section 50. It is noted that slot numbers 1, 2, 3, 4 and 5 are allocated to the macro-cell layer and slot numbers 6, 7 and 8 are allocated to the small-cell layer in the example of FIG. 9.

(S202) Each of the intra-macro-cell-layer control section 40 and the intra-small-cell-layer control section 50 designates allocation numbers (slot numbers) of time slots set to a base station and a timing (absolute time T1) for setting the allocation numbers, for a base station in its own cell layer.

(S203) Each of the base stations that belong to each of the macro-cell layer and the small-cell layer changes time slots used by its own base station to the foregoing designated time slots at the foregoing designated absolute time T1.

By performing the time-slot allocation control by the foregoing procedures (S201)-(S203), as shown in FIG. 9, it is capable of setting the allocation numbers (slot numbers) of time slots to be allocated to the macro cells 200A and 200B and the allocation numbers (slot numbers) of time slots to be allocated to the small cells 310A, 320A, 330A, 310B, 320B and 330B to the foregoing predetermined slot numbers, at the predetermined timing T1 of setting time.

Figure 10A:
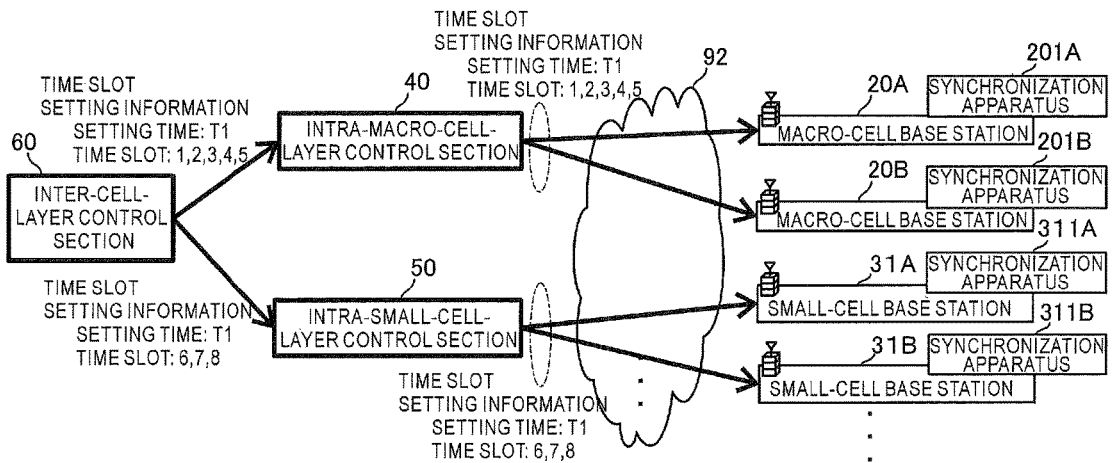
FIG. 10A is an illustration showing a more concrete configuration example of a control system capable of performing a time-slot allocation control in the mobile communication system according to the present embodiment.
Figure 10B:
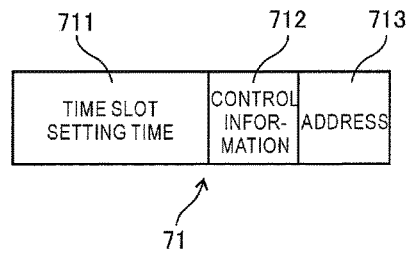
FIG. 10B is an illustration showing a configuration example of a control packet used for the same time-slot allocation control.
Figure 10C:
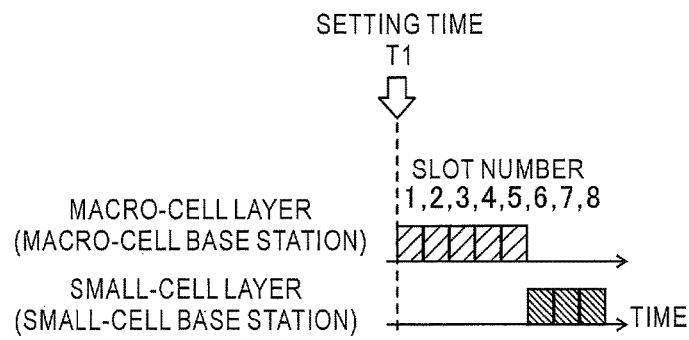
FIG. 10C is an illustration showing a state of change of radio resources before and after the same time-slot allocation control.

FIG. 10A is an illustration showing a more concrete configuration example of a control system capable of performing a time-slot allocation control in the mobile communication system according to the present embodiment, FIG. 10B is an illustration showing a configuration example of a control packet used for the same time-slot allocation control, and FIG. 10C is an illustration showing a state of change of radio resources before and after the same time-slot allocation control.

In FIG. 10A, the inter-cell-layer control section 60 transmits a control packet 71 including a setting time (absolute time) T1 for performing a time-slot allocation control and slot numbers of time slots to be designated, to each of the intra-macro-cell-layer control section 40 and the intra-small-cell-layer control section 50, at a predetermined timing. It is noted that slot numbers 1, 2, 3, 4 and 5 are allocated to the macro-cell layer and slot numbers 6, 7 and 8 are allocated to the small-cell layer in the example of FIG. 10A.

The control packet 71 includes, for example, as shown in FIG. 10B, an inter-cell adjusting control data part 711 in which the foregoing time stamp designating the setting time (absolute time) T1 and the foregoing slot numbers are set, a control information part 712 in which other control information is set, and an address part 713 in which an address of destination of the control packet is set. In the address part 713, for example, an IP address allocated to the intra-macro-cell-layer control section 40 or the intra-small-cell-layer control section 50 is set.

When the intra-macro-cell-layer control section 40 receives a control packet 71 from the inter-cell-layer control section 60, the intra-macro-cell-layer control section 40 transmits the control packet 71 to all of the macro-cell base stations 20A and 20B that belong to the macro-cell layer via a general-purpose inter-base-station interface (for example, an X2 interface in LTE) established in an IP packet network of the mobile communication network, at a predetermined timing after the receiving. In the address part 713 of the control packet 71, for example, an IP address allocated to any one of the macro-cell base stations 20A and 20B, which is the destination of transmission, is set. When each of the macro-cell base stations 20A and 20B receives the control packet 71, radio resources used for communications with the mobile station 10 are changed so that the time slots of slot numbers 1, 2, 3, 4 and 5 are used at the timing of setting time T1 designated with the time stamp of the control packet 71 by synchronization apparatuses 201A and 201B in the base stations.

On the other hand, when the intra-small-cell-layer control section 50 receives a control packet 71 from the inter-cell-layer control section 60, the intra-small-cell-layer control section 50 transmits the control packet 71 to all of the small-cell base stations 31A, 31B, . . . that belong to the small-cell layer via the foregoing general-purpose inter-base-station interface (for example, an X2 interface in LTE), at a predetermined timing after the receiving. In the address part 703 of this control packet 71, for example, an IP address allocated to any one of the small-cell base stations 31A, 31B, . . . which is the destination of transmission, is set. When each of the small-cell base stations 31A, 31B, . . . receives the control packet 71, radio resources used for communications with the mobile station 10 are changed so that the time slots of slot numbers 6, 7 and 8 are used at the timing of setting time T1 designated with the time the stamp of control packet 71 by synchronization apparatuses 311A, 311B, . . . in the base stations.

As shown in FIG. 10C, it is capable of allocation the time slots of the predetermined slot numbers foe each of the macro-cell layer and the small-cell layer, by performing the time-slot allocation control at the foregoing predetermined setting time T1.

Figure 11:
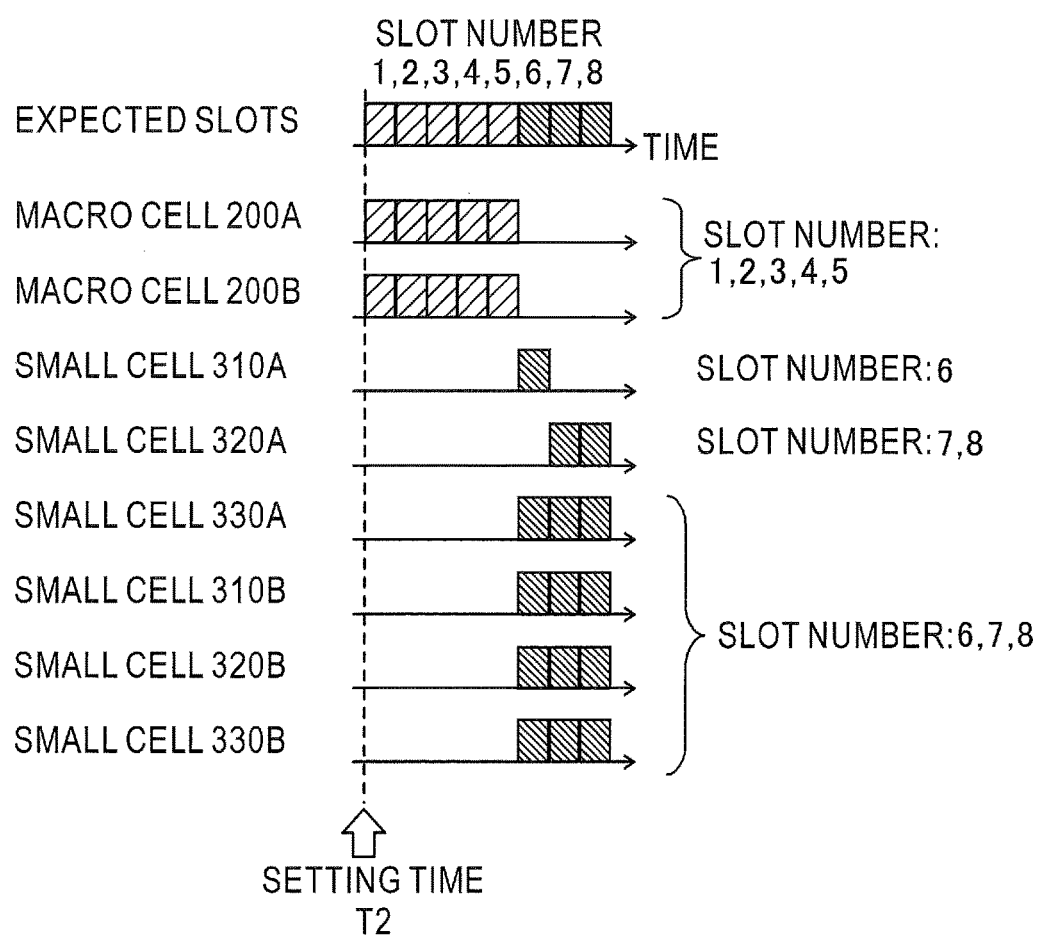
FIG. 11 is an illustration showing an example of radio resources of a macro cell and a small cell after a control of another time-slot allocation control in the mobile communication system according to the present embodiment.

FIG. 11 is an illustration showing radio resources of a macro cell and a small cell after a control of another time-slot allocation control in the mobile communication system according to the present embodiment. This time-slot allocation control is performed, assuming that the aforementioned time slots are synchronized between respective base stations, for example, by the procedures (S301)-(S303).

(S301) The inter-cell-layer control section 60 designates allocation numbers (slot numbers) of time slots and a timing (absolute time T2) for setting the allocation numbers for each of the intra-macro-cell-layer control section 40 and the intra-small-cell-layer control section 50. It is noted that slot numbers 1, 2, 3, 4 and 5 are allocated to the macro-cell layer and slot numbers 6, 7 and 8 are allocated to the small-cell layer in the example of FIG. 11.

(S302) Each of the intra-macro-cell-layer control section 40 and the intra-small-cell-layer control section 50 designates allocation numbers (slot numbers) of time slots that are uniquely set to a base station and a timing (absolute time T2) for setting the allocation numbers, for a base station in its own cell layer. It is noted that, in the example of FIG. 11, a slot number 6 is allocated to the small cell 310A, slot numbers 7 and 8 are allocated to the small cell 320A, and slot numbers 6, 7 and 8 are allocated to the other small cells 330A, 310B, 320B and 330B. By this allocation, it is capable of preventing interference between the small cell 310A and the small cell 320A that are adjacent to each other.

(S303) Each of the base stations that belong to each of the macro-cell layer and the small-cell layer changes time slots used by its own base station to the foregoing designated time slots at the foregoing designated absolute time T2.

By performing the time-slot allocation control by the foregoing procedures (S301)-(S303), as shown in FIG. 11, it is capable of setting the allocation numbers (slot numbers) of time slots to be allocated to the macro cells 200A and 200B and the allocation numbers (slot numbers) of time slots to be allocated to the small cells 310A, 320A, 330A, 310B, 320B and 330B to the foregoing predetermined slot numbers, at the predetermined timing T2 of setting time. Furthermore, since the same intra-cell-layer control section does not need to perform any adjustment of time-slot allocation with the other cell layers, the time-slot allocation control can be simplified.

Figure 12A:
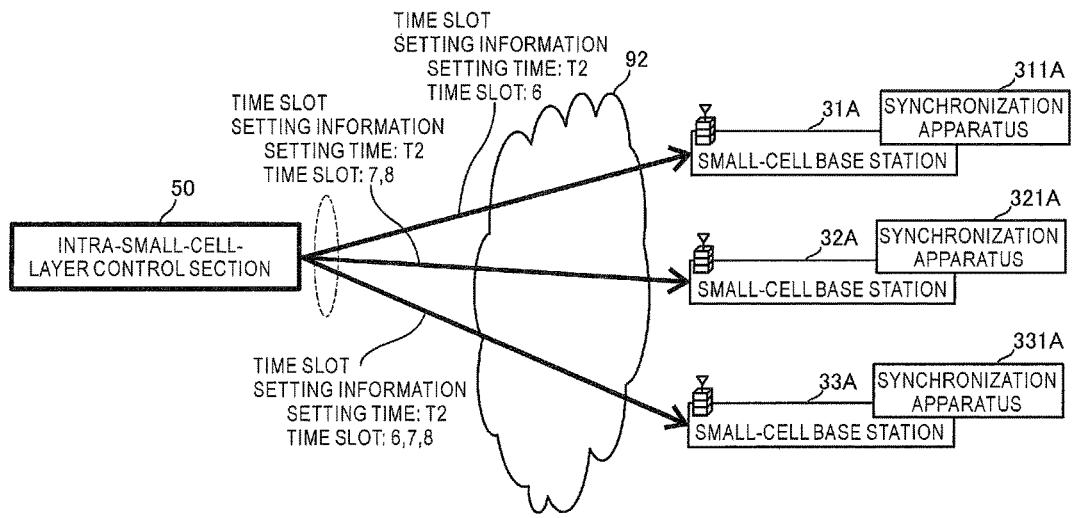
FIG. 12A is an illustration showing a more concrete configuration example of a control system capable of performing another time-slot allocation control in the mobile communication system according to the present embodiment.
Figure 12B:
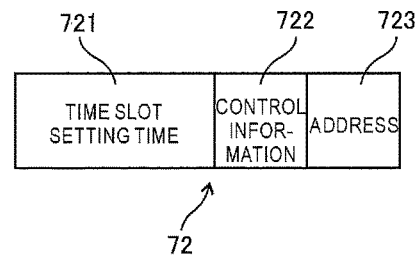
FIG. 12B is an illustration showing a configuration example of a control packet used for the same time-slot allocation control.
Figure 12C:
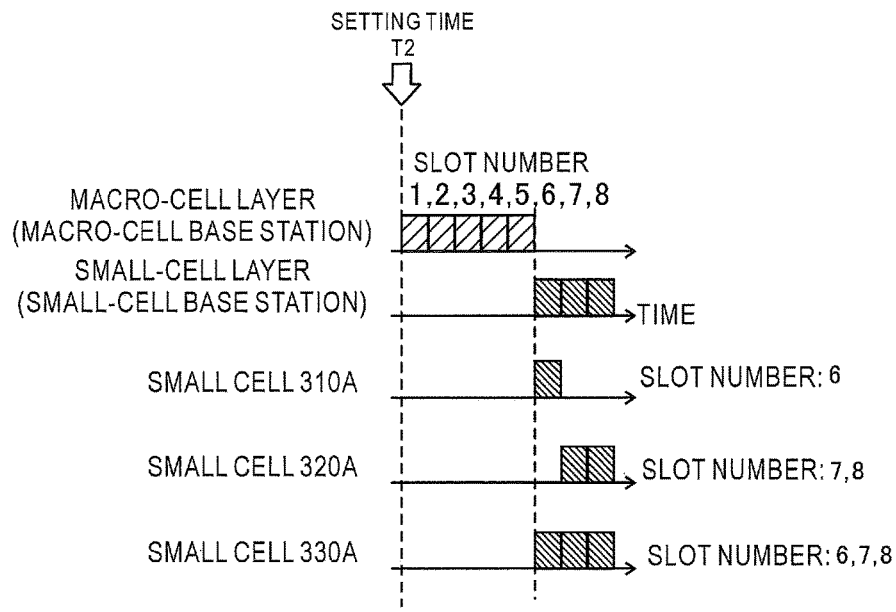
FIG. 12C is an illustration showing a state of change of radio resources before and after the same time-slot allocation control.

FIG. 12A is an illustration showing a more concrete configuration example of a control system capable of performing another time-slot allocation control in the mobile communication system according to the present embodiment, FIG. 12B is an illustration showing a configuration example of a control packet used for the same time-slot allocation control, and FIG. 12C is an illustration showing a state of changing radio resources before and after the same time-slot allocation control.

It is noted that, in FIG. 12A, since a transmission of control packet 72 from the inter-cell-layer control section 60 to the intra-macro-cell-layer control section 40 and the intra-small-cell layer control section 50, a transmission of control packet 72 from the intra-macro-cell-layer control section 40 to the macro-cell base stations 20A and 20B, and a time-slot allocation control in the macro-cell base stations 20A and 20B are same as those in FIG. 10A, the description will be omitted.

When the intra-small-cell-layer control section 50 receives a control packet 72 from the inter-cell-layer control section 60, the intra-small-cell-layer control section 50 transmits the control packet 72 to all of the small-cell base stations 31A, 32A, 33A, . . . that belong to the small-cell layer via the foregoing general-purpose inter-base-station interface (for example, an X2 interface in LTE), at a predetermined timing after the receiving.

The control packet 72 includes, for example, as shown in FIG. 12B, an inter-cell adjusting control data part 721 in which the foregoing time stamp designating the setting time (absolute time) T2 and the foregoing slot numbers are set, a control information part 722 in which other control information is set, and an address part 723 in which an address of destination of the control packet is set. In the address part 723, for example, an IP address allocated to each of the small-cell base stations 31A, 32A, 33A, . . . is set. Furthermore, slot numbers that are uniquely allocated to the respective small-cell base stations 31A, 32A, 33A, . . . by the intra-small-cell layer control section 50 are set in the inter-cell adjusting control data part 721. For example, in the example shown in the figure, a slot number 6 is allocated to the small-cell base station 31A, slot numbers 7 and 8 are set to the small-cell base station 32A, and slot numbers 6, 7 and 8 are set to the small-cell base station 33A. By this setting, it is capable of preventing interference between the small cell 310A and the small cell 320A that are adjacent to each other. It is noted that, for the other small-cell base stations 31B, 32B and 33B, for example, slot numbers 6, 7 and 8 are set as same as the small-cell base station 33A.

As shown in FIG. 12C, by performing the time-slot allocation control at the predetermined setting timing T2, it is capable of allocating the time slot of predetermined slot number to each of the macro-cell layer and the small-cell layer. Furtheremore, since the intra-small-cell-layer control section 50 does not need to perform any adjustment of time-slot allocation with the other intra-macro-cell-layer control section 40, the time-slot allocation control can be simplified.

As described above, according to the present embodiments, it is capable of preventing interference between the two or more cells of the macro-cell base stations 20A and 20B and the small-cell base stations 31A, 32A, 33A, 34A, 31B, 32B, 33B and 34B. Furthermore, the inter-cell adjusting control of radio resources (time-slot synchronization control and time-slot allocation control) for each of the two or more of the macro-cell base stations 20A and 20B and the small-cell base stations 31A, 32A, 33A, 34A, 31B, 32B, 33B and 34B can be simplified.

Although the cases in which the cell layers are two cell layers of the macro-cell layer and the small-cell layer are described, the present invention is similarly applicable to cases in which the mobile communication system includes an arbitrary number (N) of cell layers.

Figure 13:
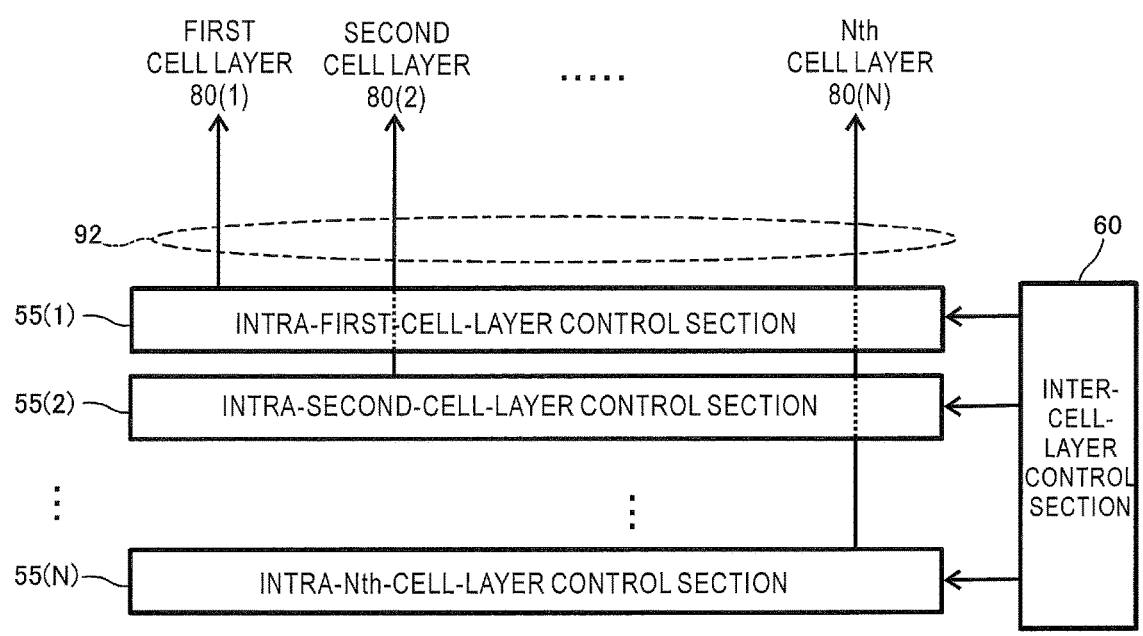
FIG. 13 is an illustration showing an example of control system for an inter-cell adjusting control of radio resources in the mobile communication system according to another embodiment.

FIG. 13 is an illustration showing an example of control system for an inter-cell adjusting control of radio resources in the mobile communication system according to another embodiment. In the mobile communication system shown in FIG. 13, N-cell layers (first cell layer 80(1)-Nth cell layer 80(N)) are configured by grouping two or more base stations. And the mobile communication system comprises N numbers of intra-cell-layer control sections 55(1)-55(N) and an inter-cell-layer control section 60, so that an inter-cell adjusting control of radio resources (time-slot synchronization control and time-slot allocation control) performed between the two or more base stations is performed by separating a control in a same cell layer and a control between cell layers.

Figure 14A:
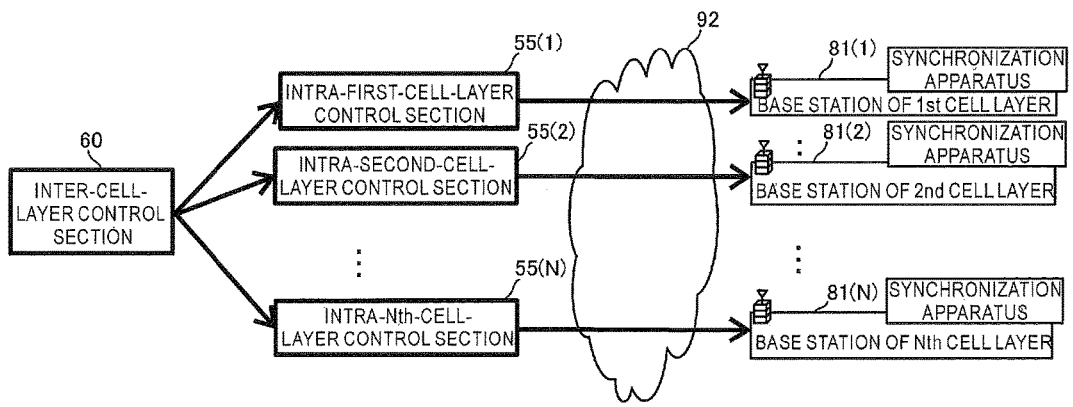
FIG. 14A is an illustration showing a more concrete configuration example of a control system capable of performing the inter-cell adjusting control of radio resources in the mobile communication system in FIG. 13.
Figure 14B:
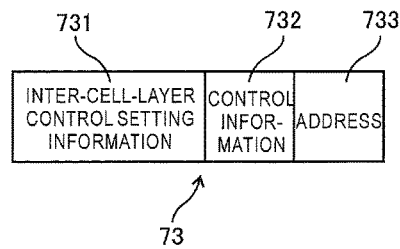
FIG. 14B is an illustration showing a configuration example of a control packet transmitted from an inter-cell-layer control section.
Figure 14C:
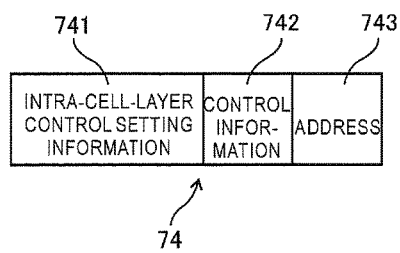
FIG. 14C is an illustration showing a configuration example of a control packet transmitted from each of intra-cell-layer control sections.

FIG. 14A is an illustration showing a more concrete configuration example of a control system capable of performing the inter-cell adjusting control of radio resources in the mobile communication system in FIG. 13, FIG. 14B is an illustration showing a configuration example of a control packet transmitted from an inter-cell-layer control section 60, and FIG. 14C is an illustration showing a configuration example of a control packet transmitted from each of intra-cell-layer control sections 55(1)-55(N).

In FIG. 14A, the inter-cell-layer control section 60 transmits a control packet 73 including a setting time (absolute time) for performing an inter-cell adjusting control of radio resources and slot numbers of time slots to be designated, to each of the intra-cell-layer control sections 55(1)-55(N), at a predetermined timing.

The control packet 73 includes, for example, as shown in FIG. 14B, an inter-cell-layer adjusting control data part 731 in which the foregoing time stamp designating the setting time (absolute time) and the slot numbers are set, a control information part 732 in which other control information is set, and an address part 733 in which an address of destination of the control packet is set. In the address part 733, for example, an IP address allocated to the intra-cell-layer control section 55(1)-55(N) is set.

Each of the intra-cell-layer control section 55(1)-55(N) performs the inter-cell adjusting control of radio resources (time-slot synchronization control and time-slot allocation control) with each of two or more base stations 81(1)-81(N) included in its own cell layer via a general-purpose inter-base-station interface (for example, an X2 interface in LTE).

For example, when receiving the control packet 73 from the inter-cell-layer control section 60, each of the intra-cell-layer control sections 55(1)-55(N) transmits the control packet 74 to all of the base stations 81(1)-81(N) that belong to its own cell layer via the foregoing general-purpose inter-base-station interface, at a predetermined timing after the receiving.

The control packet 74 includes, for example, as shown in FIG. 14C, an inter-cell-layer adjusting control data part 741 in which the foregoing time stamp designating the setting time (absolute time) and the slot numbers are set, a control information part 742 in which other control information is set, and an address part 743 in which an address of destination of the control packet is set. In the address part 743, for example, an IP address allocated to any one of the base stations 81(1)-81(N) to be as a transmission destination is set.

When each of the base stations 81(1)-81(N) receives the control packet 74, radio resources used for communications with the mobile station 10 are changed so that the designated time slots of slot numbers are used at the timing of setting time designated with the time stamp of the control packet 74, by a synchronization apparatus in the base station.

Figure 15:
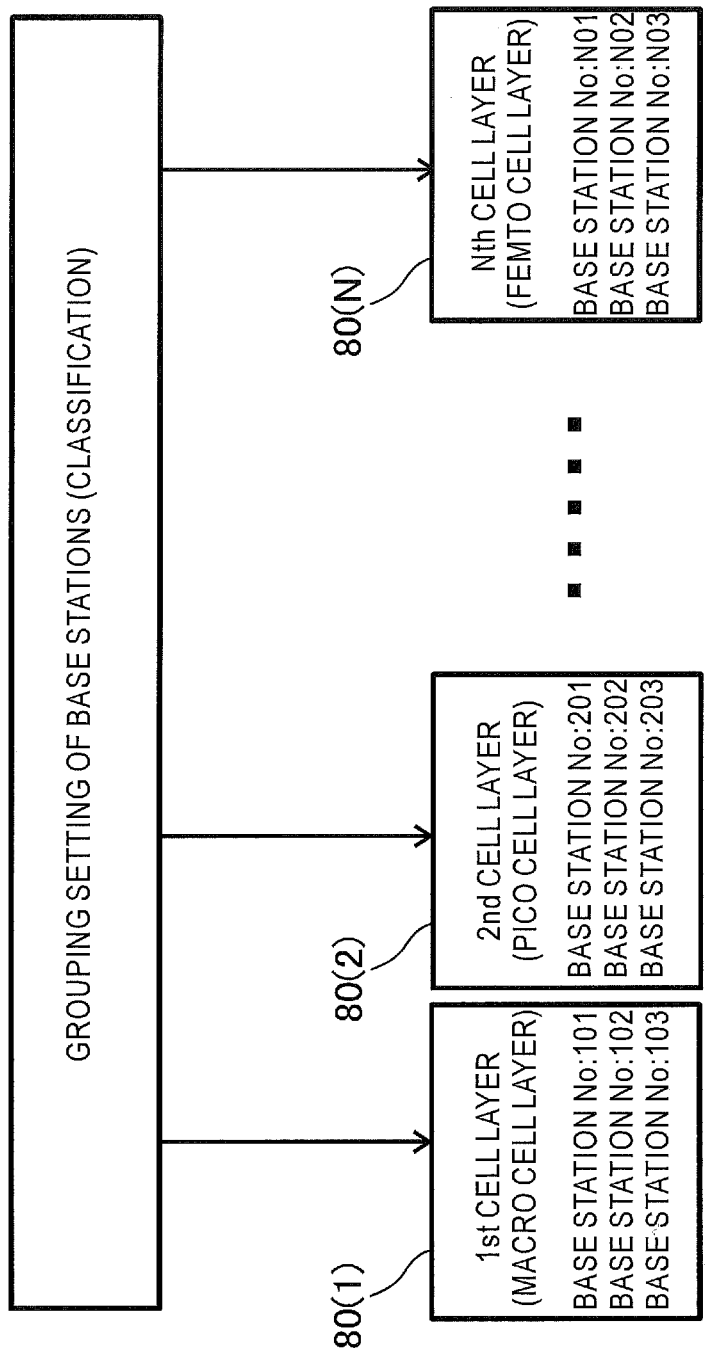
FIG. 15 is an illustration showing an example of grouping setting (classification) of base stations when forming any N cell layers.

Furthermore, in the aforementioned embodiments, the base stations may be classified and registered so that characteristics including at least of a transmission power and a cell size are different from each other in N cell layers (first cell layer 80(1)-Nth cell layer 80(N)). For example, as shown in a grouping setting (classification) of base stations in FIG. 15, the first cell layer may be a macro-cell layer comprising two or more macro-cell base stations (base station number: 101-103 . . . ), the second cell layer may be a pico-cell layer comprising two or more pico-cell base stations (base station number: 201-203 . . . ) and the Nth cell layer may be a femto-cell layer comprising two or more femto-cell base stations (base station number: N01-N03 . . . ).

Moreover, in the aforementioned embodiments, the forgoing radio-resource allocation control may be performed by the inter-cell-layer control section and the intra-cell-layer control section in cooperation with each other, for example, as shown in the followings.

Figure 16:
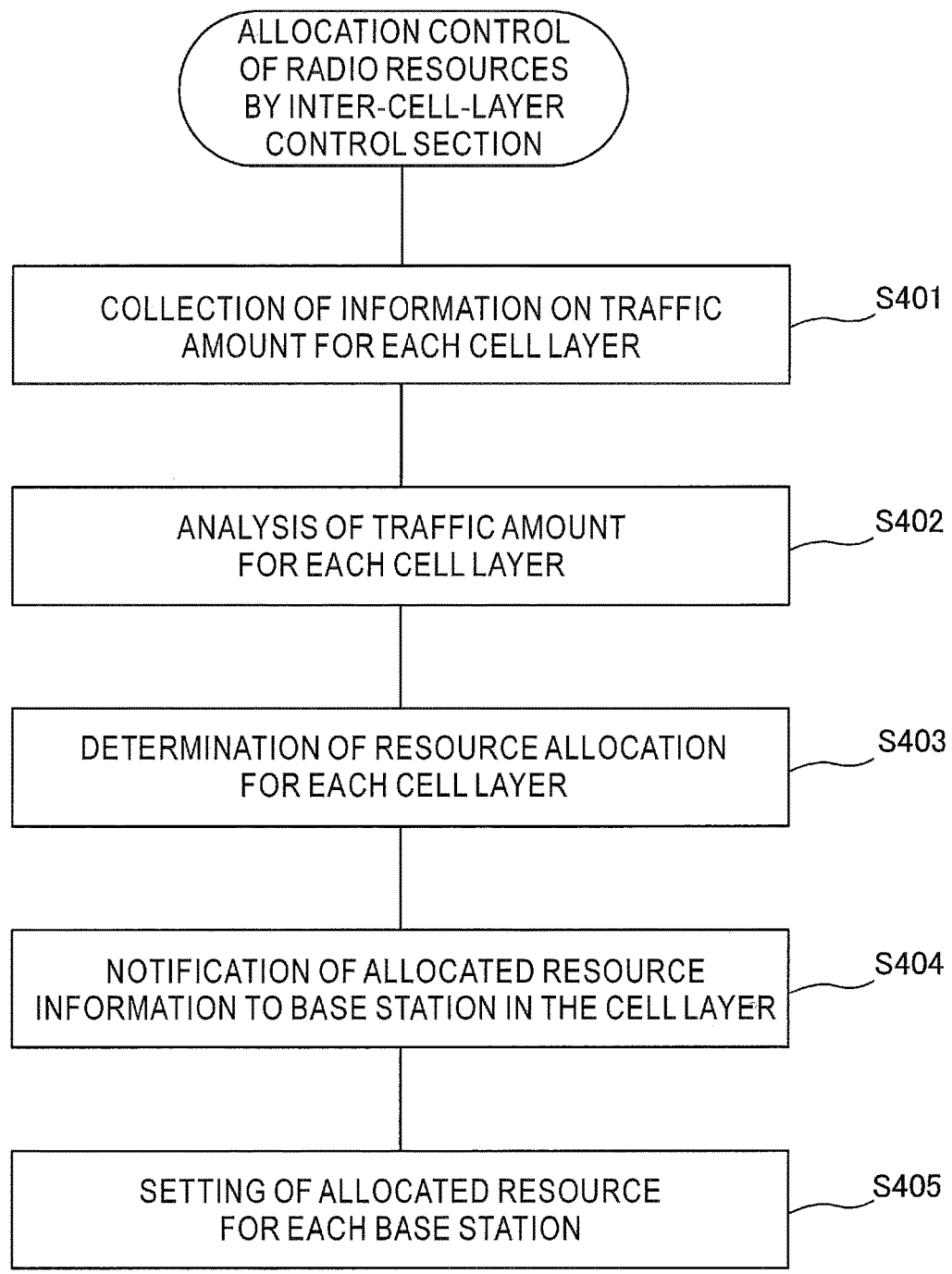
FIG. 16 is a flowchart showing an example of allocation control of radio resources by an inter-cell-layer control section.

FIG. 16 is a flowchart showing an example of allocation control of radio resources by an inter-cell-layer control section. It is noted that, although the case of arbitrary N cell layers 80(1)-80(N) in FIG. 13 will be described in FIG. 16, the forgoing radio-resource allocation control in FIG. 16 can be similarly described in the cases of cell-layer configuration configured with the macro-cell layer and the small-cell layer shown in FIG. 1 to FIG. 12.

In FIG. 16, to begin with, information on a traffic amount (throughput) of each cell layer is collected with respect to the two or more cell layers 80(1)-80(N) (S401). For example, each of the base stations in the two or more cell layers 80(1)-80(N) measures or estimates a traffic amount at each fixed time designated in advance, and transmits the result to the intra-cell-layer control section of the cell layer to which the base station itself belongs.

Next, each of the intra-cell-layer control sections 55(1)-55(N) analyzes and determines a traffic amount necessary in the cell layer corresponding to the intra-cell-layer control section itself, based on the information on traffic amount received from the base station (S402). For example, each of the intra-cell-layer control sections 55(1)-55(N) determines by using an average value of traffic amounts, a cumulative x % value (for example, 5% value) in a distribution of traffic amounts of the cell layer corresponding to the intra-cell-layer control section itself, and so on, as a traffic amount necessary in the cell layer corresponding to the intra-cell-layer control section itself. The result of traffic amount necessary for each of the cell layers 80(1)-80(N) determined in this way is transmitted to the inter-cell-layer control section 60 from each of the intra-cell-layer control sections 55(1)-55(N).

Next, the inter-cell-layer control section 60 determines the number of time-slot allocations and an allocation position of slot (time slot) in the radio resource to be allocated on a time axis in a frequency resource, as an allocation of radio resource for each of the cell layers, based on the information on traffic amount of each cell layer received from the each of the intra-cell-layer control sections 55(1)-55(N) (S403). For example, the inter-cell-layer control section 60 determines the number of allocations of time slots to be allocated to each of the cell layers 80(1)-80(N), by distributing them in proportion to a traffic amount of each cell layer. Allocation resource information, which includes the number of time-slot allocations and the allocation position of time slot to be allocated to each of the cell layers and a setting time (allocation time) at which the allocation of time slot is reflected, is transmitted to each of the intra-cell-layer control sections 55(1)-55(N) from the inter-cell-layer control section 60.

Next, each of the intra-cell-layer control sections 55(1)-55(N), which receives the foregoing allocation resource information, notifies the allocation resource information (the number of time-slot allocations and the allocation position of time slot, and the setting time at which the time-slot allocation is reflected) allocated to the cell layer, to a base station in the cell layer corresponding to the intra-cell-layer control section itself (S404).

Next, each base station changes and sets the number of time-slot allocations and the allocation position of time slot in the radio resource used for communicating with the mobile station, at the predetermined setting time (allocation time), based on the allocation resource information received from the intra-cell-layer control section of the cell layer to which the intra-cell-layer control section itself (S405).

By the allocation control of radio resources of FIG. 16 described above, it is capable of changing the allocation of time slots in the radio resources in each of the two or more cell layers 80(1)-80(N) to the appropriate allocation of time slots according to the traffic amount necessary in each of the cell layers.

Figure 17:
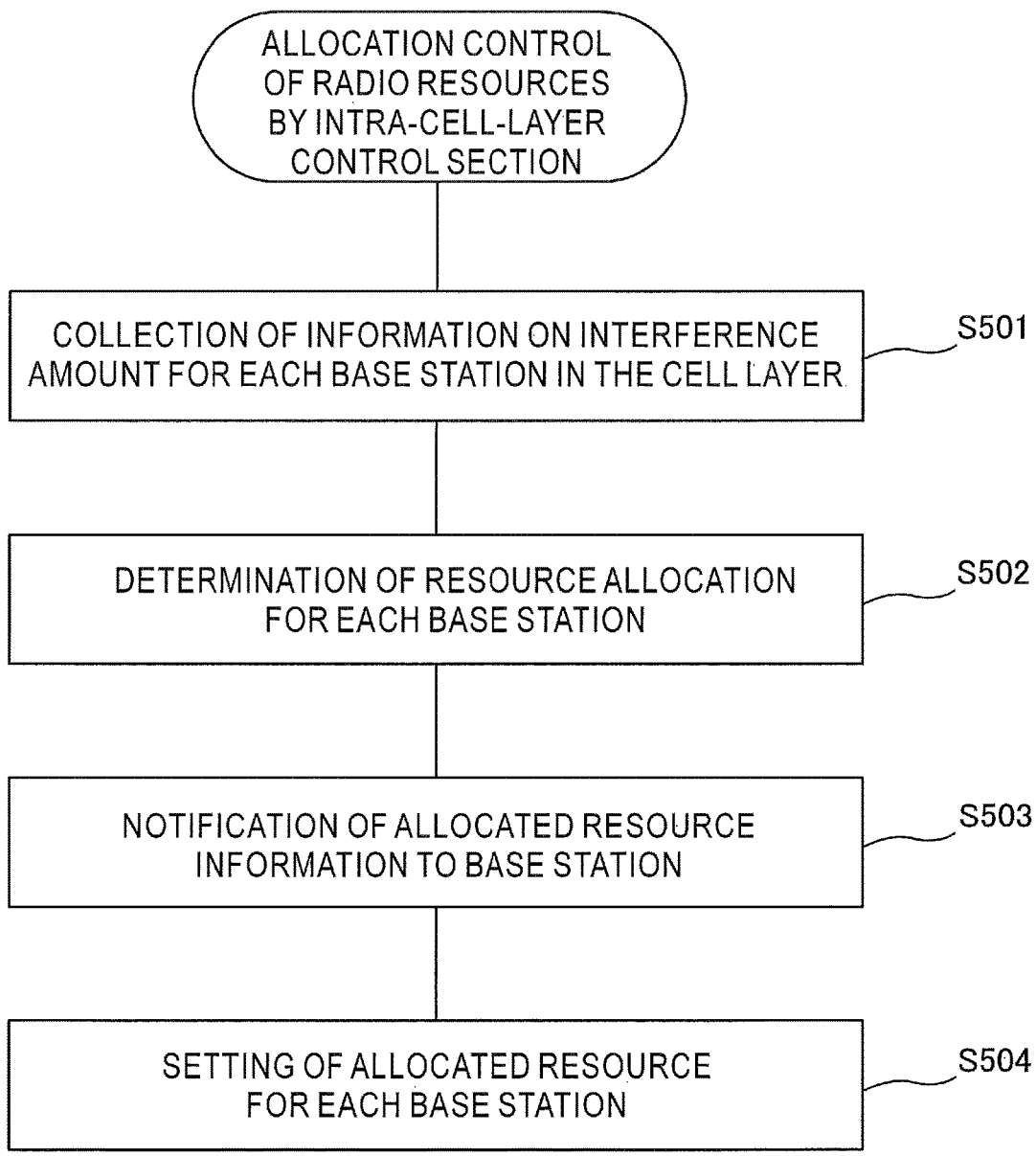
FIG. 17 is a flowchart showing an example of allocation control of radio resources by an intra-cell-layer control section.

FIG. 17 is a flowchart showing an example of allocation control of radio resources by an intra-cell-layer control section. It is noted that, although the case of arbitrary N cell layers 80(1)-80(N) in FIG. 13 will be described in FIG. 17, the forgoing radio-resource allocation control in FIG. 17 can be similarly described in the cases of cell-layer configuration configured with the macro-cell layer and the small-cell layer shown in FIG. 1 to FIG. 12.

In FIG. 17, to begin with, information on interference amount of each base station in the cell layer itself is collected with respect to the two or more cell layers 80(1)-80(N) (S501). For example, each of base stations in the two or more cell layers 80(1)-80(N) measures or estimates interference amount at each fixed time designated in advance, and transmits the result to the intra-cell-layer control section of the cell layer to which the base station itself belongs.

Next, each of the intra-cell-layer control sections 55(1)-55(N) determines the number of time-slot allocations and an allocation position of slot (time slot) on a time axis in a frequency resource, as an allocation of radio resource to be allocated to the base station, based on the information on interference amount received from the base station in the cell layer itself (S502). For example, each of the intra-cell-layer control sections 55(1)-55(N) estimates a traffic amount (throughput) achievable when changing the allocation of radio resources (the number of time-slot allocations and the allocation position of time slot) to be allocated to the base station, based on the information on interference amount received from the base station in the cell layer itself, and determines the number of time-slot allocations and the allocation position of time slot so that the estimated value becomes maximum or optimal.

Next, each of the intra-cell-layer control sections 55(1)-55(N) notifies the allocation resource information (the number of time-slot allocations and the allocation position of time slot, and the setting time at which the allocation of time slots is reflected) allocated to a base station in the cell layer corresponding to the intra-cell-layer control section itself, to the base station (S503).

Next, each base station changes and sets the number of time-slot allocations and the allocation position of time slot in the radio resource used for communicating with the mobile station, at the predetermined setting time (allocation time), based on the allocation resource information received from the intra-cell-layer control section of the cell layer to which the base station itself (S504).

By the allocation control of radio resources of FIG. 17 described above, it is capable of changing the allocation of time slots in the radio resources in the base station that belongs to each of the cell layers 80(1)-80(N) to the appropriate allocation of time slots by which the traffic amount (throughput) in each base station becomes maximum or optimal.

It is noted that process steps and configuration elements in the macro-cell base stations 20A and 20B, the small-cell base stations 31A, 31B, . . . , the intra-macro-cell-layer control section 40, the intra-small-cell-layer control section 50, the inter-cell-layer control section 60, the mobile station 10, etc. described in the present specification can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, server, gateway, switching equipment, computer, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 10 mobile station
20A, 20B macro-cell base station
200A, 200B macro cell
31A, 32A, 33A, 34A small-cell base station
310A, 320A, 330A, 340A small cell
31B, 32B, 33B, 34B small-cell base station
310B, 320B, 330B, 340B small cell
40 intra-macro-cell-layer control section
50 intra-small-cell-layer control section 55(1)~55(N) intra-cell-layer control section
60 inter-cell-layer control section
70 control packet
80(1)-80(N) cell layer

The invention claimed is:

1. A mobile communication system, comprising:
two or more base stations grouped into two or more cell layers, at least a part of each cell of the base stations being mutually overlapped;
an inter-cell-layer control section for performing an inter-cell adjusting control of radio resources between the two or more cell layers, the inter-cell adjusting control including at least one of a synchronization control of time slots and an allocation control of time slots in radio resources that includes two or more time slots in radio communications in a same frequency band between the two or more base station and a mobile station; and
two or more intra-cell-layer control section for performing an intra-cell adjusting control of radio resources between the two or more base stations included in the cell layer, for each of the cell layers, the intra-cell adjusting control including at least one of the synchronization control of time slots and the allocation control of time slots in the radio resources of the same frequency band between the two or more base station included in the cell layer based on the time slots allocated for the cell layer by the inter-cell-layer control section,
wherein the inter-cell-layer control section transmits identification information designating a time slot to be allocated to the cell layer of the intra-cell-layer control section among two or more time slots forming the radio resource and time information designating a timing to change the allocation of time slot based on the identification information of time slot, to each of the two or more intra-cell-layer control sections;
wherein each of the two or more intra-cell-layer control sections transmits the identification information of time slot and the time information received from the inter-cell-layer control section, to two or more base stations included in the cell layer corresponding to the intra-cell-layer control section;
wherein the intra-cell-layer control section receives information on a traffic amount measured or estimated by the two or more base stations included in the cell layer corresponding to the intra-cell-layer control section from the base station, determines a traffic amount necessary for the cell layer corresponding to the intra-cell-layer control section based on the information on traffic amount, and transmits information on the traffic amount necessary for the cell layer to the inter-cell-layer control section; and
wherein the inter-cell-layer control section:
receives the traffic amount necessary for the cell layer determined by the intra-cell-layer control section; and
determines the number of time-slot allocations and an allocation position of time slot in the radio resource to be allocated to the cell layer, based on the traffic amount necessary for the cell layer.

2. The mobile communication system according to claim 1,
wherein the inter-cell-layer control section transmits time information designating a start timing of time slot of the radio resource for each of the two or more intra-cell-layer control sections; and
wherein each of the two or more intra-cell-layer control sections transmits the time information received from the inter-cell-layer control section, to a base station included in the cell layer corresponding to the intra-cell-layer control section.

3. The mobile communication system according to claim 1, wherein each of the two or more intra-cell layer control section transmits, to each of two or more base stations included in a cell layer corresponding to the intra-cell-layer control section, identification information on a time slot to be allocated to the two or more base stations among two or more time slots allocated to the cell layer.

4. The mobile communication system according to claim 3,
wherein the intra-cell-layer control section:
receives information on interference amount measured or estimated by the base station from the base station, with respect to each of two or more base stations included in the cell layer corresponding to the intra-cell-layer control section;
estimates a traffic amount in the base station based on the information on interference amount; and
determines the number of time-slot allocations and an allocation position of time slot in the radio resource to be allocated to the base station so as to maximize or optimize the estimated value of traffic amount in the base station, with respect to each of two or more base stations included in the cell layer corresponding to the intra-cell-layer control section.

5. The mobile communication system according to claim 1, wherein the base stations in the two or more cell layers are classified and registered so that characteristics including at least of a transmission power and a cell size are different from each other.

6. The mobile communication system according to claim 1, wherein each of the two or more intra-cell-layer control sections uses an inter-base-station interface via an IP packet network to communicate with a base station included in each of the intra-cell-layer control sections.

7. The mobile communication system according to claim 1, wherein the two or more cell layers include a macro-cell layer formed with two or more macro-cell base stations and a small-cell layer formed with two or more small-cell base station.

8. A mobile communication system, comprising:
two or more base stations grouped into two or more cell layers, at least a part of each cell of the base stations being mutually overlapped;
an inter-cell-layer control section for performing an inter-cell adjusting control of radio resources between the two or more cell layers, the inter-cell adjusting control including at least one of a synchronization control of time slots and an allocation control of time slots in radio resources that includes two or more time slots in radio communications in a same frequency band between the two or more base station and a mobile station; and
two or more intra-cell-layer control section for performing an intra-cell adjusting control of radio resources between the two or more base stations included in the cell layer, for each of the cell layers, the intra-cell adjusting control including at least one of the synchronization control of time slots and the allocation control of time slots in the radio resources of the same frequency band between the two or more base station included in the cell layer based on the time slots allocated for the cell layer by the inter-cell-layer control section, wherein each of the two or more intra-cell layer control section transmits, to each of two or more base stations included in a cell layer corresponding to the intra-cell-layer control section, identification information on a time slot to be allocated to the two or more base stations among two or more time slots allocated to the cell layer; and wherein the intra-cell-layer control section:
receives information on interference amount measured or estimated by the base station from the base station, with respect to each of two or more base stations included in the cell layer corresponding to the intra-cell-layer control section;

estimates a traffic amount in the base station based on the information on interference amount; and determines the number of time-slot allocations and an allocation position of time slot in the radio resource to be allocated to the base station so as to maximize or optimize the estimated value of traffic amount in the base station, with respect to each of two or more base stations included in the cell layer corresponding to the intra-cell-layer control section.

9. The mobile communication system according to claim 8, wherein the inter-cell-layer control section transmits identification information designating a time slot to be allocated to the cell layer of the intra-cell-layer control section among two or more time slots forming the radio resource and time information designating a timing to change the allocation of time slot based on the identification information of time slot, to each of the two or more intra-cell-layer control sections; and wherein each of the two or more intra-cell-layer control sections transmits the identification information of time slot and the time information received from the inter-cell-layer control section, to two or more base stations included in the cell layer corresponding to the intra-cell-layer control section.

10. The mobile communication system according to claim 9, wherein the intra-cell-layer control section receives information on a traffic amount measured or estimated by the two or more base stations included in the cell layer corresponding to the intra-cell-layer control section from the base station, determines a traffic amount necessary for the cell layer corresponding to the intra-cell-layer control section based on the information on traffic amount, and transmits information on the traffic amount necessary for the cell layer to the inter-cell-layer control section; and wherein the inter-cell-layer control section:
receives the traffic amount necessary for the cell layer determined by the intra-cell-layer control section; and determines the number of time-slot allocations and an allocation position of time slot in the radio resource to be allocated to the cell layer, based on the traffic amount necessary for the cell layer.

11. The mobile communication system according to claim 8, wherein the inter-cell-layer control section transmits time information designating a start timing of time slot of the radio resource for each of the two or more intra-cell-layer control sections; and wherein each of the two or more intra-cell-layer control sections transmits the time information received from the inter-cell-layer control section, to a base station included in the cell layer corresponding to the intra-cell-layer control section.

12. The mobile communication system according to claim 8, wherein the base stations in the two or more cell layers are classified and registered so that characteristics including at least of a transmission power and a cell size are different from each other.

13. The mobile communication system according to claim 8, wherein each of the two or more intra-cell-layer control sections uses an inter-base-station interface via an IP packet network to communicate with a base station included in each of the intra-cell-layer control sections.

14. The mobile communication system according to claims 8, wherein the two or more cell layers include a macro-cell layer formed with two or more macro-cell base stations and a small-cell layer formed with two or more small-cell base station.

15. A mobile communication system, comprising:
two or more base stations grouped into two or more cell layers, at least a part of each cell of the base stations being mutually overlapped;

an inter-cell-layer control section for performing an inter-cell adjusting control of radio resources between the two or more cell layers, the inter-cell adjusting control including at least one of a synchronization control of time slots and an allocation control of time slots in radio resources that includes two or more time slots in radio communications in a same frequency band between the two or more base station and a mobile station; and two or more intra-cell-layer control sections for performing an intra-cell adjusting control of radio resources between the two or more base stations included in the cell layer, for each of the cell layers, the intra-cell adjusting control including at least one of the synchronization control of time slots and the allocation control of time slots in the radio resources of the same frequency band between the two or more base station included in the cell layer based on the time slots allocated for the cell layer by the inter-cell-layer control section, wherein the inter-cell-layer control section transmits first time information designating a start timing of time slot of the radio resource for each of the two or more intra-cell-layer control sections;

wherein each of the two or more intra-cell-layer control sections transmits the first time information received from the inter-cell-layer control section, to a base station included in the cell layer corresponding to the intra-cell-layer control section;

wherein the inter-cell-layer control section transmits identification information designating a time slot to be allocated to the cell layer of the intra-cell-layer control section among two or more time slots forming the radio resource and second time information designating a timing to change the allocation of the time slot based on the identification information of the time slot, to each of the two or more intra-cell-layer control sections; and wherein each of the two or more intra-cell-layer control sections transmits the identification information of the time slot and the second time information received from the inter-cell-layer control section, to two or more base stations included in the cell layer corresponding to the intra-cell-layer control section.

16. The mobile communication system according to claim 15, wherein the intra-cell-layer control section receives information on a traffic amount measured or estimated by the two or more base stations included in the cell layer corresponding to the intra-cell-layer control section from the base station, determines a traffic amount necessary for the cell layer corresponding to the intra-cell-layer control section based on the information on traffic amount, and transmits information on the traffic amount necessary for the cell layer to the inter-cell-layer control section; and wherein the inter-cell-layer control section:
receives the traffic amount necessary for the cell layer determined by the intra-cell-layer control section; and determines the number of time-slot allocations and an allocation position of time slot in the radio resource to be allocated to the cell layer, based on the traffic amount necessary for the cell layer.

17. The mobile communication system according to claim 15, wherein each of the two or more intra-cell layer control section transmits, to each of two or more base stations included in a cell layer corresponding to the intra-cell-layer control section, identification information on a time slot to be allocated to the two or more base stations among two or more time slots allocated to the cell layer.

18. The mobile communication system according to claim 17, wherein the intra-cell-layer control section:
receives information on interference amount measured or estimated by the base station from the base station, with respect to each of two or more base stations included in the cell layer corresponding to the intra-cell-layer control section;
estimates a traffic amount in the base station based on the information on interference amount; and
determines the number of time-slot allocations and an allocation position of time slot in the radio resource to be allocated to the base station so as to maximize or optimize the estimated value of traffic amount in the base station, with respect to each of two or more base stations included in the cell layer corresponding to the intra-cell-layer control section.

19. The mobile communication system according to claim 15, wherein the base stations in the two or more cell layers are classified and registered so that characteristics including at least of a transmission power and a cell size are different from each other.

20. The mobile communication system according to claim 15, wherein each of the two or more intra-cell-layer control sections uses an inter-base-station interface via an IP packet network to communicate with a base station included in each of the intra-cell-layer control sections.

21. The mobile communication system according to claims 15, wherein the two or more cell layers include a macro-cell layer formed with two or more macro-cell base stations and a small-cell layer formed with two or more small-cell base station.

22. A radio resource control method of a base station in a mobile communication system, comprising:
configuring two or more cell layers by grouping two or more base station, at least a part of each cell of the base stations being mutually overlapped;
performing an inter-cell adjusting control of radio resources between the two or more cell layers, the inter-cell adjusting control including at least one of a synchronization control of time slots and an allocation control of time slots in radio resources that includes two or more time slots in radio communications in a same frequency band between the two or more base station and a mobile station;
performing an intra-cell adjusting control of radio resources between the two or more base stations included in the cell layer, for each of the cell layers, the intra-cell adjusting control including at least one of the synchronization control of time slots and the allocation control of time slots in the radio resources of the same frequency band between the two or more base station included in the cell layer based on the time slots allocated for the cell layer;
designating a time slot to be allocated to the cell layer among two or more time slots forming the radio resource and a timing to change the allocation of time slot, for each of the two or more cell layers;
designating a time slot to be allocated to the cell layer and a timing to change the allocation of time slot, for two or more base stations included in the cell layer, in each of the two or more cell layers;
measuring or estimating a traffic amount in each of two or more base stations included in the cell layer, with respect to each of the two or more cell layers;
determining a traffic amount necessary for each of the two or more cell layers based on a result of the measurement or estimation of traffic amount; and
determining the number of time-slot allocations and an allocation position of time slot in the radio resource to be allocated to the cell layer, based on the traffic amount necessary for the cell layer, for each of the two or more cell layers.

23. The radio resource control method according to claim 22, comprising:
designating a start timing of time slot of the radio resource for each of the two or more cell layers; and
designating a start timing of time slot of the radio resource for a base station included in the two or more cell layers.

24. The radio resource control method according to claim 22, comprising designating a time slot to be allocated to two or more base stations among two or more time slots allocated to the cell layer, for two or more base stations included in the cell layer, in each of the two or more cell layers.

25. The radio resource control method according to claim 24, comprising:
measuring or estimating interference amount in each of two or more base stations included in the cell layer, with respect to each of the two or more cell layers;
estimating a traffic amount in the base station based on a result of the measurement or estimation of interference amount, with respect to each of the two or more base stations; and
determining the number of time-slot allocations and an allocation position of time slot in the radio resource to be allocated to the base station so as to maximize or optimize the estimated value of traffic amount in the base station, with respect to each of the two or more base stations.

26. The radio resource control method according to claim 22, wherein the base stations in the two or more cell layers are classified and registered so that characteristics including at least of a transmission power and a cell size are different from each other.

27. The radio resource control method according to claim 22, wherein an inter-base-station interface via an IP packet network is used for an inter-cell adjusting control of a radio resource between the two or more base stations.

28. The radio resource control method according to claim 22, wherein the two or more cell layers include a macro-cell layer formed with two or more macro-cell base stations and a small-cell layer formed with two or more small-cell base station.

29. A radio resource control method of a base station in a mobile communication system, comprising:
- configuring two or more cell layers by grouping two or more base station, at least a part of each cell of the base stations being mutually overlapped;
- performing an inter-cell adjusting control of radio resources between the two or more cell layers, the inter-cell adjusting control including at least one of a synchronization control of time slots and an allocation control of time slots in radio resources that includes two or more time slots in radio communications in a same frequency band between the two or more base station and a mobile station;
- performing an intra-cell adjusting control of radio resources between the two or more base stations included in the cell layer, for each of the cell layers, the intra-cell adjusting control including at least one of the synchronization control of time slots and the allocation control of time slots in the radio resources of the same frequency band between the two or more base station included in the cell layer based on the time slots allocated for the cell layer;
- designating a time slot to be allocated to two or more base stations among two or more time slots allocated to the cell layer, for two or more base stations included in the cell layer, in each of the two or more cell layers;
- measuring or estimating interference amount in each of two or more base stations included in the cell layer, with respect to each of the two or more cell layers;
- estimating a traffic amount in the base station based on a result of the measurement or estimation of interference amount, with respect to each of the two or more base stations; and
- determining the number of time-slot allocations and an allocation position of time slot in the radio resource to be allocated to the base station so as to maximize or optimize the estimated value of traffic amount in the base station, with respect to each of the two or more base stations.

30. The radio resource control method according to claim 29, comprising:
- designating a time slot to be allocated to the cell layer among two or more time slots forming the radio resource and a timing to change the allocation of time slot, for each of the two or more cell layers; and
- designating a time slot to be allocated to the cell layer and a timing to change the allocation of time slot, for two or more base stations included in the cell layer, in each of the two or more cell layers.

31. The radio resource control method according to claim 30, comprising:
- measuring or estimating a traffic amount in each of two or more base stations included in the cell layer, with respect to each of the two or more cell layers;
- determining a traffic amount necessary for each of the two or more cell layers based on a result of the measurement or estimation of traffic amount; and
- determining the number of time-slot allocations and an allocation position of time slot in the radio resource to be allocated to the cell layer, based on the traffic amount necessary for the cell layer, for each of the two or more cell layers.

32. The radio resource control method according to claim 29, comprising:
- designating a start timing of time slot of the radio resource for each of the two or more cell layers; and
- designating a start timing of time slot of the radio resource for a base station included in the two or more cell layers.

33. The radio resource control method according to claim 29, wherein the base stations in the two or more cell layers are classified and registered so that characteristics including at least of a transmission power and a cell size are different from each other.

34. The radio resource control method according to claim 29, wherein an inter-base-station interface via an IP packet network is used for an inter-cell adjusting control of a radio resource between the two or more base stations.

35. The radio resource control method according to claim 29, wherein the two or more cell layers include a macro-cell layer formed with two or more macro-cell base stations and a small-cell layer formed with two or more small-cell base station.

36. A radio resource control method of a base station in a mobile communication system, comprising:
- configuring two or more cell layers by grouping two or more base station, at least a part of each cell of the base stations being mutually overlapped;
- performing an inter-cell adjusting control of radio resources between the two or more cell layers, the inter-cell adjusting control including at least one of a synchronization control of time slots and an allocation control of time slots in radio resources that includes two or more time slots in radio communications in a same frequency band between the two or more base station and a mobile station;
- performing an intra-cell adjusting control of radio resources between the two or more base stations included in the cell layer, for each of the cell layers, the intra-cell adjusting control including at least one of the synchronization control of time slots and the allocation control of time slots in the radio resources of the same frequency band between the two or more base station included in the cell layer based on the time slots allocated for the cell layer;
- designating a start timing of time slot of the radio resource for each of the two or more cell layers;
- designating a start timing of time slot of the radio resource for a base station included in the two or more cell layers;
- designating a time slot to be allocated to the cell layer among two or more time slots forming the radio resource and a timing to change the allocation of the time slot, for each of the two or more cell layers; and
- designating a time slot to be allocated to the cell layer and a timing to change the allocation of the time slot, for two or more base stations included in the cell layer, in each of the two or more cell layers.

37. The radio resource control method according to claim 36, comprising:
- measuring or estimating a traffic amount in each of two or more base stations included in the cell layer, with respect to each of the two or more cell layers;
- determining a traffic amount necessary for each of the two or more cell layers based on a result of the measurement or estimation of traffic amount; and
- determining the number of time-slot allocations and an allocation position of time slot in the radio resource to be allocated to the cell layer, based on the traffic amount necessary for the cell layer, for each of the two or more cell layers.

38. The radio resource control method according to claim 36, comprising designating a time slot to be allocated to two or more base stations among two or more time slots allocated to the cell layer, for two or more base stations included in the cell layer, in each of the two or more cell layers.

39. The radio resource control method according to claim 38, comprising:
   measuring or estimating interference amount in each of two or more base stations included in the cell layer, with respect to each of the two or more cell layers;
   estimating a traffic amount in the base station based on a result of the measurement or estimation of interference amount, with respect to each of the two or more base stations; and
   determining the number of time-slot allocations and an allocation position of time slot in the radio resource to be allocated to the base station so as to maximize or optimize the estimated value of traffic amount in the base station, with respect to each of the two or more base stations.

40. The radio resource control method according to claim 36, wherein the base stations in the two or more cell layers are classified and registered so that characteristics including at least of a transmission power and a cell size are different from each other.

41. The radio resource control method according to claim 36, wherein an inter-base-station interface via an IP packet network is used for an inter-cell adjusting control of a radio resource between the two or more base stations.

42. The radio resource control method according to claim 36, wherein the two or more cell layers include a macro-cell layer formed with two or more macro-cell base stations and a small-cell layer formed with two or more small-cell base station.

* * * * *